US012785877B2

(12) United States Patent
Sung et al.

(10) Patent No.: US 12,785,877 B2
(45) Date of Patent: Nov. 3, 2026

(54) OPEN RADIO ACCESS NETWORK MESSAGE CONFIGURATIONS

(71) Applicant: QUALCOMM Incorporated, San Diego, CA (US)

(72) Inventors: Doohyun Sung, Basking Ridge, NJ (US); Raja Sekhar Bachu, Kendall Park, NJ (US); Kanchan Kumar Gorain, Somerset, NJ (US); Rakesh Dugad, Basking Ridge, NJ (US)

(73) Assignee: QUALCOMM Incorporated, San Diego, CA (US)

(*) Notice: Subject to any disclaimer, the term of this patent is extended or adjusted under 35 U.S.C. 154(b) by 459 days.

(21) Appl. No.: 18/003,082

(22) PCT Filed: Aug. 26, 2021

(86) PCT No.: PCT/US2021/047677

§ 371 (c)(1),
(2) Date: Dec. 22, 2022

(87) PCT Pub. No.: WO2022/046980

PCT Pub. Date: Mar. 3, 2022

(65) Prior Publication Data

US 2023/0336295 A1 Oct. 19, 2023

(30) Foreign Application Priority Data

Aug. 28, 2020 (IN) .............................. 202041037076

(51) Int. Cl.
*H04L 43/0852* (2022.01)
*H04L 5/00* (2006.01)
*H04L 43/0876* (2022.01)

(52) U.S. Cl.
CPC .................................. *H04L 5/0048* (2013.01)

(58) Field of Classification Search
None
See application file for complete search history.

(56) References Cited

U.S. PATENT DOCUMENTS

2020/0128496 A1 4/2020 Rama Chandran
2021/0120538 A1* 4/2021 Huh ...................... H04L 5/0094

FOREIGN PATENT DOCUMENTS

EP 2574138 A1 3/2013
WO WO-2021112747 A1 * 6/2021 ........... H04L 5/0051

OTHER PUBLICATIONS

International Search Report and Written Opinion—PCT/US2021/047677—ISA/EPO—Mar. 14, 2022.

(Continued)

*Primary Examiner* — Maharishi V Khirodhar
(74) *Attorney, Agent, or Firm* — Muncy, Geissler, Olds & Lowe, P.C./Qualcomm Incorporated

(57) ABSTRACT

In an aspect, an O-DU transmits a C-Plane message including a section description that specifies common PRB information associated with a plurality of RSs, the section description comprising a set of RS-specific section description extensions that each specify a PRB offset and a modulation scaling factor for a respective RS among the plurality of RSs. The O-RU processes the C-Plane message with modulation compression in accordance with the set of RS-specific section description extensions. In another aspect, a first O-RAN unit (e.g., O-DU or O-RU) transmits a message to a second O-RAN unit (e.g., O-RU or O-DU) associated with combining across symbols at an O-RU.

20 Claims, 22 Drawing Sheets

(56) References Cited

OTHER PUBLICATIONS

O-RAN Fronthaul Working Group 4: "Control, User and Synchronization Plane Specification", Internet Citation, Aug. 2, 2019, pp. 1-218, XP009527536, Section 6.3.3.13, p. 22, The whole document, pp. 37-41, 94.
ORAN: "O-RAN Working Group 2 A1 Interface: Application Protocol", Jul. 20, 2020 (Jul. 20, 2020), XP055869257, 59 Pages, Retrieved from the Internet: URL: https://www.o-ran.org. [Retrieved on Dec. 3, 2021] The whole document.
Partial International Search Report—PCT/US2021/047677—ISA/EPO—Dec. 21, 2021.

* cited by examiner

Section Type 1 : DL/UL control msgs

| 0 (msb) | 1 | 2 | 3 | 4 | 5 | 6 | 7 (lsb) | # of bytes | |
|---|---|---|---|---|---|---|---|---|---|
| transport header, see section 3.1.3 | | | | | | | | 8 | Octet 1 |
| dataDirection | payloadVersion | | | filterIndex | | | | 1 | Octet 9 |
| frameId | | | | | | | | 1 | Octet 10 |
| subframeId | | | | slotId | | | | 1 | Octet 11 |
| slotId | | startSymbolid | | | | | | 1 | Octet 12 |
| numberOfsections | | | | | | | | 1 | Octet 13 |
| sectionType = 1 | | | | | | | | 1 | Octet 14 |
| udCompHdr | | | | | | | | 1 | Octet 15 |
| reserved | | | | | | | | 1 | Octet 16 |
| sectionId | | | | | | | | 1 | Octet 17 |
| sectionId | | | | rb | symInc | startPrbc | | 1 | Octet 18 |
| startPrbc | | | | | | | | 1 | Octet 19 |
| numPrbc | | | | | | | | 1 | Octet 20 |
| reMask[11:4] | | | | | | | | 1 | Octet 21 |
| reMask[3:0] | | | | numSymbol | | | | 1 | Octet 22 |
| ef = 1 | beamId[14:8] | | | | | | | 1 | Octet 23 |
| beamId[7:0] | | | | | | | | 1 | Octet 24 |
| section extensions as indicated by "ef" | | | | | | | | var | Octet 25 |
| ... | | | | | | | | | |
| sectionId | | | | | | | | 1 | Octet N |
| sectionId | | | | rb | symInc | startPrbc | | 1 | N+1 |
| startPrbc | | | | | | | | 1 | N+2 |
| numPrbc | | | | | | | | 1 | N+3 |
| reMask[11:4] | | | | | | | | 1 | N+4 |
| reMask[3:0] | | | | numSymbol | | | | 1 | N+5 |
| ef = 0 | beamId[14:8] | | | | | | | 1 | N+6 |
| beamId[7:0] | | | | | | | | 1 | N+7 |
| section extensions as indicated by "ef" | | | | | | | | var | N+8 |
| | | | | | | | | | Octet M |

FIG. 8

900

| 0 (msb) | 1 | 2 | 3 | 4 | 5 | 6 | 7 (lsb) | # of bytes | |
|---|---|---|---|---|---|---|---|---|---|
| ef | extType = 0xYY | | | | | | | 1 | Octet N |
| extLen = 0x02 (2 words) | | | | | | | | 1 | N+1 |
| startPrbcOffset | | stepPrbc | | reMask[11:8] | | | | 1 | N+2 |
| reMask[7:0] | | | | | | | | 1 | N+3 |
| symbolMask[13:6] | | | | | | | | 1 | N+4 |
| symbolMask[5:0] | | | | | | csf | modCompScaler[14] | 1 | N+5 |
| modCompScaler[13:6] | | | | | | | | 1 | N+6 |
| modCompScaler[5:0] | | | | | | reserved | | 1 | N+7 |

*FIG. 9*

1000

| 0 (msb) | 1 | 2 | 3 | 4 | 5 | 6 | 7 (lsb) | # of bytes | |
|---|---|---|---|---|---|---|---|---|---|
| ef | extType = 0xYY | | | | | | | 1 | Octet N |
| extLen = 0x02 (2 words) | | | | | | | | 1 | N+1 |
| startPrbcOffset | | stepPrbc | | | reMask[11:9] | | | 1 | N+2 |
| reMask[8:1] | | | | | | | | 1 | N+3 |
| reMask[0] | symbolMask[13:7] | | | | | | | 1 | N+4 |
| symbolMask[6:0] | | | | | | | csf | 1 | N+5 |
| modCompScaler[14:7] | | | | | | | | 1 | N+6 |
| modCompScaler[6:0] | | | | | | | reserved | 1 | N+7 |

*FIG. 10*

| 0 (msb) | 1 | 2 | 3 | 4 | 5 | 6 | 7 (lsb) | # of bytes | |
|---|---|---|---|---|---|---|---|---|---|
| extLen = 0x02 (2 words) | | | | | | | | 1 | N+1 |
| startPrbcOffset | | | stepPrbc | | | reMask[11:10] | | 1 | N+2 |
| reMask[9:2] | | | | | | | | 1 | N+3 |
| reMask[1:0] | | symbolMask[13:8] | | | | | | 1 | N+4 |
| symbolMask[7:0] | | | | | | | | 1 | N+5 |
| reserved | | | | | | | | 2 | N+6 |

1200

| 0 (msb) | 1 | 2 | 3 | 4 | 5 | 6 | 7 (lsb) | # of bytes | |
|---|---|---|---|---|---|---|---|---|---|
| ef | extType = 0xYY | | | | | | | 1 | Octet N |
| extLen = 0x03 (3 words) | | | | | | | | 1 | N+1 |
| startPrbcOffset | | | | | | | | 1 | N+2 |
| stepPrbc | | | | | | | | 1 | N+3 |
| reMask[11:4] | | | | | | | | 1 | N+4 |
| reMask[3:0] | | | | symMask[13:10] | | | | 1 | N+5 |
| symMask[9:2] | | | | | | | | 1 | N+6 |
| symMask[1:0] | | beamId[14:9] | | | | | | 1 | N+7 |
| beamId[8:1] | | | | | | | | 1 | N+8 |
| beamId[0] | csf | modCompScaler[14:9] | | | | | | 1 | N+9 |
| modCompScaler[8:1] | | | | | | | | 1 | N+10 |
| modCompScaler[0] | reserved | | | | | | | 1 | N+11 |

FIG. 12

1300

| Section Type 3 : PRACH & mixed-numerology | | | | | | | | | |
|---|---|---|---|---|---|---|---|---|---|
| 0 (msb) | 1 | 2 | 3 | 4 | 5 | 6 | 7 (lsb) | # of bytes | |
| transport header, see section 3.1.3 | | | | | | | | 8 | Octet 1 |
| dataDirection | payloadVersion | | | filterIndex | | | | 1 | Octet 9 |
| frameId | | | | | | | | 1 | Octet 10 |
| subframeId | | | | slotId | | | | 1 | Octet 11 |
| slotId | | startSymbolid | | | | | | 1 | Octet 12 |
| numberOfsections | | | | | | | | 1 | Octet 13 |
| sectionType = 3 | | | | | | | | 1 | Octet 14 |
| timeOffset | | | | | | | | 2 | Octet 15 |
| frameStructure | | | | | | | | 1 | Octet 17 |
| cpLength | | | | | | | | 2 | Octet 18 |
| udCompHdr | | | | | | | | 1 | Octet 20 |
| sectionId | | | | | | | | 1 | Octet 21 |
| sectionId | | | | rb | symInc | startPrbc | | 1 | Octet 22 |
| startPrbc | | | | | | | | 1 | Octet 23 |
| numPrbc | | | | | | | | 1 | Octet 24 |
| reMask[11:4] | | | | | | | | 1 | Octet 25 |
| reMask[3:0] | | | | numSymbol | | | | 1 | Octet 26 |
| ef | beamId[14:8] | | | | | | | 1 | Octet 27 |
| beamId[7:0] | | | | | | | | 1 | Octet 28 |
| freqOffset | | | | | | | | 3 | Octet 29 |
| reserved (8 bits) | | | | | | | | 1 | Octet 32 |
| section extensions as indicated by "ef" | | | | | | | | var | Octet 33 |

1302

FIG. 13

1700

| Section Type 3 : PRACH & mixed-numerology | | | | | | | | | |
|---|---|---|---|---|---|---|---|---|---|
| 0 (msb) | 1 | 2 | 3 | 4 | 5 | 6 | 7 (lsb) | # of bytes | |
| transport header, see section 3.1.3 | | | | | | | | 8 | Octet 1 |
| dataDirection | payloadVersion | | | filterIndex | | | | 1 | Octet 9 |
| frameId | | | | | | | | 1 | Octet 10 |
| subframeId | | | | slotId | | | | 1 | Octet 11 |
| slotId | | startSymbolid | | | | | | 1 | Octet 12 |
| numberOfsections | | | | | | | | 1 | Octet 13 |
| sectionType = 3 | | | | | | | | 1 | Octet 14 |
| timeOffset | | | | | | | | 2 | Octet 15 |
| frameStructure | | | | | | | | 1 | Octet 17 |
| cpLength | | | | | | | | 2 | Octet 18 |
| udCompHdr | | | | | | | | 1 | Octet 20 |
| sectionId | | | | | | | | 1 | Octet 21 |
| sectionId | | | | rb | symInc | startPrbc | | 1 | Octet 22 |
| startPrbc | | | | | | | | 1 | Octet 23 |
| numPrbc | | | | | | | | 1 | Octet 24 |
| reMask[11:4] | | | | | | | | 1 | Octet 25 |
| reMask[3:0] | | | | numSymbol | | | | 1 | Octet 26 |
| ef | beamId[14:8] | | | | | | | 1 | Octet 27 |
| beamId[7:0] | | | | | | | | 1 | Octet 28 |
| freqOffset | | | | | | | | 3 | Octet 29 |
| combSym | reserved (7 bits) | | | | | | | 1 | Octet 32 |
| section extensions as indicated by "ef" | | | | | | | | var | Octet 33 |

1702

FIG. 17

1800

| Section Type 3 : PRACH & mixed-numerology | | | | | | | | | |
|---|---|---|---|---|---|---|---|---|---|
| 0 (msb) | 1 | 2 | 3 | 4 | 5 | 6 | 7 (lsb) | # of bytes | |
| transport header, see section 3.1.3 | | | | | | | | 8 | Octet 1 |
| dataDirection | payloadVersion | | | filterIndex | | | | 1 | Octet 9 |
| frameId | | | | | | | | 1 | Octet 10 |
| subframeId | | | | slotId | | | | 1 | Octet 11 |
| slotId | | startSymbolid | | | | | | 1 | Octet 12 |
| numberOfsections | | | | | | | | 1 | Octet 13 |
| sectionType = 3 | | | | | | | | 1 | Octet 14 |
| timeOffset | | | | | | | | 2 | Octet 15 |
| frameStructure | | | | | | | | 1 | Octet 17 |
| cpLength | | | | | | | | 2 | Octet 18 |
| udCompHdr | | | | | | | | 1 | Octet 20 |
| sectionId | | | | | | | | 1 | Octet 21 |
| sectionId | | | | rb | symInc | startPrbc | | 1 | Octet 22 |
| startPrbc | | | | | | | | 1 | Octet 23 |
| numPrbc | | | | | | | | 1 | Octet 24 |
| reMask[11:4] | | | | | | | | 1 | Octet 25 |
| reMask[3:0] | | | | numSymbol | | | | 1 | Octet 26 |
| ef | beamId[14:8] | | | | | | | 1 | Octet 27 |
| beamId[7:0] | | | | | | | | 1 | Octet 28 |
| freqOffset | | | | | | | | 3 | Octet 29 |
| maxConsecSymCombining | | | | reserved (4 bits) | | | | 1 | Octet 32 |
| section extensions as indicated by "ef" | | | | | | | | var | Octet 33 |

1802

FIG. 18

1900

| 0 (msb) | 1 | 2 | 3 | 4 | 5 | 6 | 7 (lsb) | # of bytes | |
|---|---|---|---|---|---|---|---|---|---|
| ef | extType = 0xYY | | | | | | | 1 | Octet N |
| extLen = 0x01 (1 words) | | | | | | | | 1 | N+1 |
| maxConsecPrachSymCohCombining (n bits) | | | | | reserved (8 – n bits) | | | 1 | N+2 |
| reserved | | | | | | | | 1 | N+3 |

*FIG. 19*

OPEN RADIO ACCESS NETWORK MESSAGE CONFIGURATIONS

CROSS-REFERENCE TO RELATED APPLICATIONS

The present application for patent claims priority to International Patent Application No. PCT/US2021/047677, entitled "OPEN RADIO ACCESS NETWORK MESSAGE CONFIGURATIONS", filed Aug. 26, 2021, and Indian Application No. 202041037076, entitled "OPEN RADIO ACCESS NETWORK MESSAGE CONFIGURATIONS," filed Aug. 28, 2020, both of which are assigned to the assignee hereof, and expressly incorporated herein by reference in their entirety.

BACKGROUND OF THE DISCLOSURE

1. Field of the Disclosure

Aspects of the disclosure relate generally to wireless communications, and more particularly to open radio access network (O-RAN) message configurations.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating an open radio access network (O-RAN) radio unit (O-RU) includes receiving, from an O-RAN distributed unit (O-DU), a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and processing the C-Plane message with modulation compression in accordance with the set of RS-specific section description extensions.

In some aspects, at least one RS-specific section description extension of the set of RS-specific section description extensions further specifies beamforming information for the respective RS.

In some aspects, the plurality of RSs comprises a phase tracking RS (PT-RS), a demodulation RS (DM-RS), a channel state information RS (CSI-RS), a sounding reference signal (SRS), or a combination thereof.

In an aspect, a method of operating an open radio access network (O-RAN) distributed unit (O-DU) includes configuring a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and transmitting the C-Plane message to an O-RAN radio unit (O-RU) that supports modulation compression.

In some aspects, at least one RS-specific section description extension of the set of RS-specific section description extensions further specifies beamforming information for the respective RS.

In some aspects, the plurality of RSs comprises a phase tracking RS (PT-RS), a demodulation RS (DM-RS), a channel state information RS (CSI-RS), a sounding reference signal (SRS), or a combination thereof.

In an aspect, a method of operating a first open radio access network (O-RAN) unit includes determining to transmit a message to a second O-RAN unit that is associated with combining across symbols at an O-RAN radio unit (O-RU); and transmitting the message to the second O-RAN unit.

In some aspects, the first O-RAN unit corresponds to the O-RU, and the second O-RAN unit corresponds to an O-RAN distributed unit (O-DU).

In some aspects, the message specifies whether the O-RU is capable of combining across symbols.

In some aspects, the message specifies a maximum number of consecutive symbols that the O-RU is capable of combining.

In some aspects, the method includes receiving, from the O-DU in response to the message, a control plane (C-Plane) message from the O-DU that specifies whether the O-RU is permitted to combine consecutive symbols and/or an indication of a maximum number of consecutive symbols for which combination is permitted.

In some aspects, the second O-RAN unit corresponds to the O-RU, and the first O-RAN unit corresponds to an O-RAN distributed unit (O-DU).

In some aspects, the method includes receiving, from the O-RU, another message that specifies whether the O-RU is capable of combining across symbols.

In some aspects, the another message specifies a maximum number of consecutive symbols that the O-RU is capable of combining.

In some aspects, the message specifies whether the O-RU is permitted to combine consecutive symbols and/or an indication of a maximum number of consecutive symbols for which combination is permitted.

In some aspects, the transmitting transmits the message via management plane (M-Plane) signaling or control plane (C-Plane) signaling.

In an aspect, a method of operating a second open radio access network (O-RAN) unit includes receiving, from a first O-RAN unit, a message that is associated with combining across symbols at an O-RAN radio unit (O-RU); and performing an action in response to the message.

In some aspects, the first O-RAN unit corresponds to the O-RU, and the second O-RAN unit corresponds to an O-RAN distributed unit (O-DU).

In some aspects, the message specifies whether the O-RU is capable of combining across symbols.

In some aspects, the message specifies a maximum number of consecutive symbols that the O-RU is capable of combining.

In some aspects, the action comprises transmitting, to the O-RU in response to the message, a control plane (C-Plane) message that specifies whether the O-RU is permitted to combine consecutive symbols and/or an indication of a maximum number of consecutive symbols for which combination is permitted.

In some aspects, the second O-RAN unit corresponds to the O-RU, and the first O-RAN unit corresponds to an O-RAN distributed unit (O-DU).

In some aspects, the method includes transmitting, to the O-DU, another message that specifies whether the O-RU is capable of combining across symbols.

In some aspects, the another message specifies a maximum number of consecutive symbols that the O-RU is capable of combining.

In some aspects, the message specifies whether the O-RU is permitted to combine consecutive symbols and/or an indication of a maximum number of consecutive symbols for which combination is permitted.

In some aspects, the receiving receives the message via management plane (M-Plane) signaling or control plane (C-Plane) signaling.

In an aspect, an O-RU includes a memory; at least one transceiver; and at least one processor communicatively coupled to the memory and the at least one transceiver, the at least one processor configured to: receive, via the at least one transceiver, from an O-RAN distributed unit (O-DU), a control plane (C-Plane) message including a section description that specifies common physical resource block (PRB) information associated with a plurality of reference signals (RS s), the section description comprising a set of RS-specific section description extensions that each specify a PRB offset and a modulation scaling factor for a respective RS among the plurality of RSs; and process the C-Plane message with modulation compression in accordance with the set of RS-specific section description extensions.

In some aspects, at least one RS-specific section description extension of the set of RS-specific section description extensions further specifies beamforming information for the respective RS.

In some aspects, the plurality of RSs comprises a phase tracking RS (PT-RS), a demodulation RS (DM-RS), a channel state information RS (CSI-RS), a sounding reference signal (SRS), or a combination thereof.

In an aspect, an O-DU includes a memory; at least one transceiver; and at least one processor communicatively coupled to the memory and the at least one transceiver, the at least one processor configured to: configure a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and transmit, via the at least one transceiver, the C-Plane message to an O-RAN radio unit (O-RU) that supports modulation compression.

In some aspects, at least one RS-specific section description extension of the set of RS-specific section description extensions further specifies beamforming information for the respective RS.

In some aspects, the plurality of RSs comprises a phase tracking RS (PT-RS), a demodulation RS (DM-RS), a channel state information RS (CSI-RS), a sounding reference signal (SRS), or a combination thereof.

In an aspect, a first O-RAN unit includes a memory; at least one transceiver; and at least one processor communicatively coupled to the memory and the at least one transceiver, the at least one processor configured to: determine to transmit a message to a second O-RAN unit that is associated with combining across symbols at an O-RAN radio unit (O-RU); and transmit, via the at least one transceiver, the message to the second O-RAN unit.

In some aspects, the first O-RAN unit corresponds to the O-RU, and the second O-RAN unit corresponds to an O-RAN distributed unit (O-DU).

In some aspects, the message specifies whether the O-RU is capable of combining across symbols.

In some aspects, the message specifies a maximum number of consecutive symbols that the O-RU is capable of combining.

In some aspects, the at least one processor is further configured to: receive, via the at least one transceiver, from the O-DU in response to the message, a control plane (C-Plane) message from the O-DU that specifies whether the O-RU is permitted to combine consecutive symbols and/or an indication of a maximum number of consecutive symbols for which combination is permitted.

In some aspects, the second O-RAN unit corresponds to the O-RU, and the first O-RAN unit corresponds to an O-RAN distributed unit (O-DU).

In some aspects, the at least one processor is further configured to: receive, via the at least one transceiver, from the O-RU, another message that specifies whether the O-RU is capable of combining across symbols.

In some aspects, the another message specifies a maximum number of consecutive symbols that the O-RU is capable of combining.

In some aspects, the message specifies whether the O-RU is permitted to combine consecutive symbols and/or an indication of a maximum number of consecutive symbols for which combination is permitted.

In some aspects, the transmitting transmits the message via management plane (M-Plane) signaling or control plane (C-Plane) signaling.

In an aspect, a second O-RAN unit includes a memory; at least one transceiver; and at least one processor communicatively coupled to the memory and the at least one transceiver, the at least one processor configured to: receive, via the at least one transceiver, from a first O-RAN unit, a message that is associated with combining across symbols at an O-RAN radio unit (O-RU); and perform an action in response to the message.

In some aspects, the first O-RAN unit corresponds to the O-RU, and the second O-RAN unit corresponds to an O-RAN distributed unit (O-DU).

In some aspects, the message specifies whether the O-RU is capable of combining across symbols.

In some aspects, the message specifies a maximum number of consecutive symbols that the O-RU is capable of combining.

In some aspects, the action comprises transmitting, to the O-RU in response to the message, a control plane (C-Plane) message that specifies whether the O-RU is permitted to combine consecutive symbols and/or an indication of a maximum number of consecutive symbols for which combination is permitted.

In some aspects, the second O-RAN unit corresponds to the O-RU, and the first O-RAN unit corresponds to an O-RAN distributed unit (O-DU).

In some aspects, the at least one processor is further configured to: transmit, via the at least one transceiver, to the O-DU, another message that specifies whether the O-RU is capable of combining across symbols.

In some aspects, the another message specifies a maximum number of consecutive symbols that the O-RU is capable of combining.

In some aspects, the message specifies whether the O-RU is permitted to combine consecutive symbols and/or an indication of a maximum number of consecutive symbols for which combination is permitted.

In some aspects, the receiving receives the message via management plane (M-Plane) signaling or control plane (C-Plane) signaling.

In an aspect, an O-RU includes means for receiving, from an O-RAN distributed unit (O-DU), a control plane (C-Plane) message including a section description that specifies common physical resource block (PRB) information associated with a plurality of reference signals (RS s), the section description comprising a set of RS-specific section description extensions that each specify a PRB offset and a modulation scaling factor for a respective RS among the plurality of RSs; and means for processing the C-Plane message with modulation compression in accordance with the set of RS-specific section description extensions.

In some aspects, at least one RS-specific section description extension of the set of RS-specific section description extensions further specifies beamforming information for the respective RS.

In some aspects, the plurality of RSs comprises a phase tracking RS (PT-RS), a demodulation RS (DM-RS), a channel state information RS (CSI-RS), a sounding reference signal (SRS), or a combination thereof.

In an aspect, an O-DU includes means for configuring a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and means for transmitting the C-Plane message to an O-RAN radio unit (O-RU) that supports modulation compression.

In some aspects, at least one RS-specific section description extension of the set of RS-specific section description extensions further specifies beamforming information for the respective RS.

In some aspects, the plurality of RSs comprises a phase tracking RS (PT-RS), a demodulation RS (DM-RS), a channel state information RS (CSI-RS), a sounding reference signal (SRS), or a combination thereof.

In an aspect, a first O-RAN unit includes means for determining to transmit a message to a second O-RAN unit that is associated with combining across symbols at an O-RAN radio unit (O-RU); and means for transmitting the message to the second O-RAN unit.

In some aspects, the first O-RAN unit corresponds to the O-RU, and the second O-RAN unit corresponds to an O-RAN distributed unit (O-DU).

In some aspects, the message specifies whether the O-RU is capable of combining across symbols.

In some aspects, the message specifies a maximum number of consecutive symbols that the O-RU is capable of combining.

In some aspects, the method includes means for receiving, from the O-DU in response to the message, a control plane (C-Plane) message from the O-DU that specifies whether the O-RU is permitted to combine consecutive symbols and/or an indication of a maximum number of consecutive symbols for which combination is permitted.

In some aspects, the second O-RAN unit corresponds to the O-RU, and the first O-RAN unit corresponds to an O-RAN distributed unit (O-DU).

In some aspects, the transmitting transmits the message via management plane (M-Plane) signaling or control plane (C-Plane) signaling.

In an aspect, the first O-RAN unit includes means for receiving, from the O-RU, another message that specifies whether the O-RU is capable of combining across symbols.

In some aspects, the another message specifies a maximum number of consecutive symbols that the O-RU is capable of combining.

In an aspect, the message specifies whether the O-RU is permitted to combine consecutive symbols and/or an indication of a maximum number of consecutive symbols for which combination is permitted.

In an aspect, a second O-RAN unit includes means for receiving, from a first O-RAN unit, a message that is associated with combining across symbols at an O-RAN radio unit (O-RU); and means for performing an action in response to the message.

In an aspect, the first O-RAN unit corresponds to the O-RU, and wherein the second O-RAN unit corresponds to an O-RAN distributed unit (O-DU).

In some aspects, the message specifies whether the O-RU is capable of combining across symbols.

In some aspects, the message specifies a maximum number of consecutive symbols that the O-RU is capable of combining.

In some aspects, the action comprises transmitting, to the O-RU in response to the message, a control plane (C-Plane) message that specifies whether the O-RU is permitted to combine consecutive symbols and/or an indication of a maximum number of consecutive symbols for which combination is permitted.

In an aspect, the first O-RAN unit of herein the second O-RAN unit corresponds to the O-RU, and wherein the first O-RAN unit corresponds to an O-RAN distributed unit (O-DU).

In some aspects, the method includes means for transmitting, to the O-DU, another message that specifies whether the O-RU is capable of combining across symbols.

In some aspects, the another message specifies a maximum number of consecutive symbols that the O-RU is capable of combining.

In some aspects, the message specifies whether the O-RU is permitted to combine consecutive symbols and/or an indication of a maximum number of consecutive symbols for which combination is permitted.

In an aspect, the receiving receives the message via management plane (M-Plane) signaling or control plane (C-Plane) signaling.

In an aspect, a non-transitory computer-readable medium storing computer-executable instructions that, when executed by an O-RU, cause the O-RU to: receive, from an O-RAN distributed unit (O-DU), a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and process the C-Plane message with modulation compression in accordance with the set of RS-specific section description extensions.

In some aspects, at least one RS-specific section description extension of the set of RS-specific section description extensions further specifies beamforming information for the respective RS.

In some aspects, the plurality of RSs comprises a phase tracking RS (PT-RS), a demodulation RS (DM-RS), a channel state information RS (CSI-RS), a sounding reference signal (SRS), or a combination thereof.

In an aspect, a non-transitory computer-readable medium storing computer-executable instructions that, when executed by an O-DU, cause the O-DU to: configure a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and transmit the C-Plane message to an O-RAN radio unit (O-RU) that supports modulation compression.

In some aspects, at least one RS-specific section description extension of the set of RS-specific section description extensions further specifies beamforming information for the respective RS.

In some aspects, the plurality of RSs comprises a phase tracking RS (PT-RS), a demodulation RS (DM-RS), a channel state information RS (CSI-RS), a sounding reference signal (SRS), or a combination thereof.

In an aspect, a non-transitory computer-readable medium storing computer-executable instructions that, when executed by a first O-RAN unit, cause the first O-RAN unit to: determine to transmit a message to a second O-RAN unit that is associated with combining across symbols at an O-RAN radio unit (O-RU); and transmit the message to the second O-RAN unit.

In some aspects, the first O-RAN unit corresponds to the O-RU, and the second O-RAN unit corresponds to an O-RAN distributed unit (O-DU).

In some aspects, the message specifies whether the O-RU is capable of combining across symbols.

In some aspects, the message specifies a maximum number of consecutive symbols that the O-RU is capable of combining.

In some aspects, instructions that, when executed by first O-RAN unit, further cause the first O-RAN unit to:

In some aspects, the second O-RAN unit corresponds to the O-RU, and the first O-RAN unit corresponds to an O-RAN distributed unit (O-DU).

In some aspects, instructions that, when executed by first O-RAN unit, further cause the first O-RAN unit to:

In some aspects, the another message specifies a maximum number of consecutive symbols that the O-RU is capable of combining.

In some aspects, the message specifies whether the O-RU is permitted to combine consecutive symbols and/or an indication of a maximum number of consecutive symbols for which combination is permitted.

In some aspects, the transmitting transmits the message via management plane (M-Plane) signaling or control plane (C-Plane) signaling.

In an aspect, a non-transitory computer-readable medium storing computer-executable instructions that, when executed by a second O-RAN unit, cause the second O-RAN unit to: receive, from a first O-RAN unit, a message that is associated with combining across symbols at an O-RAN radio unit (O-RU); and perform an action in response to the message.

In some aspects, the first O-RAN unit corresponds to the O-RU, and the second O-RAN unit corresponds to an O-RAN distributed unit (O-DU).

In some aspects, the message specifies whether the O-RU is capable of combining across symbols.

In some aspects, the message specifies a maximum number of consecutive symbols that the O-RU is capable of combining.

In some aspects, the action comprises transmitting, to the O-RU in response to the message, a control plane (C-Plane) message that specifies whether the O-RU is permitted to combine consecutive symbols and/or an indication of a maximum number of consecutive symbols for which combination is permitted.

In some aspects, the second O-RAN unit corresponds to the O-RU, and the first O-RAN unit corresponds to an O-RAN distributed unit (O-DU).

In some aspects, instructions that, when executed by second O-RAN unit, further cause the second O-RAN unit to:

In some aspects, the another message specifies a maximum number of consecutive symbols that the O-RU is capable of combining.

In some aspects, the message specifies whether the O-RU is permitted to combine consecutive symbols and/or an indication of a maximum number of consecutive symbols for which combination is permitted.

In some aspects, the receiving receives the message via management plane (M-Plane) signaling or control plane (C-Plane) signaling.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 8 illustrates a conventional C-Plane message configuration.

FIG. 9 illustrates a C-Plane message configuration in accordance with an aspect of the disclosure.

FIG. 10 illustrates a C-Plane message configuration in accordance with another aspect of the disclosure.

FIG. 12 illustrates a C-Plane message configuration in accordance with another aspect of the disclosure.

FIG. 13 illustrates a Section Type 3 C-Plane message configuration in accordance with an aspect of the disclosure.

FIG. 17 illustrates a Section Type 3 C-Plane message configuration in accordance with another aspect of the disclosure.

FIG. 18 illustrates a Section Type 3 C-Plane message configuration in accordance with another aspect of the disclosure.

FIG. 19 illustrates a section extension of a Section Type 3 C-Plane message configuration in accordance with an aspect of the disclosure.

DETAILED DESCRIPTION

Figure 1:
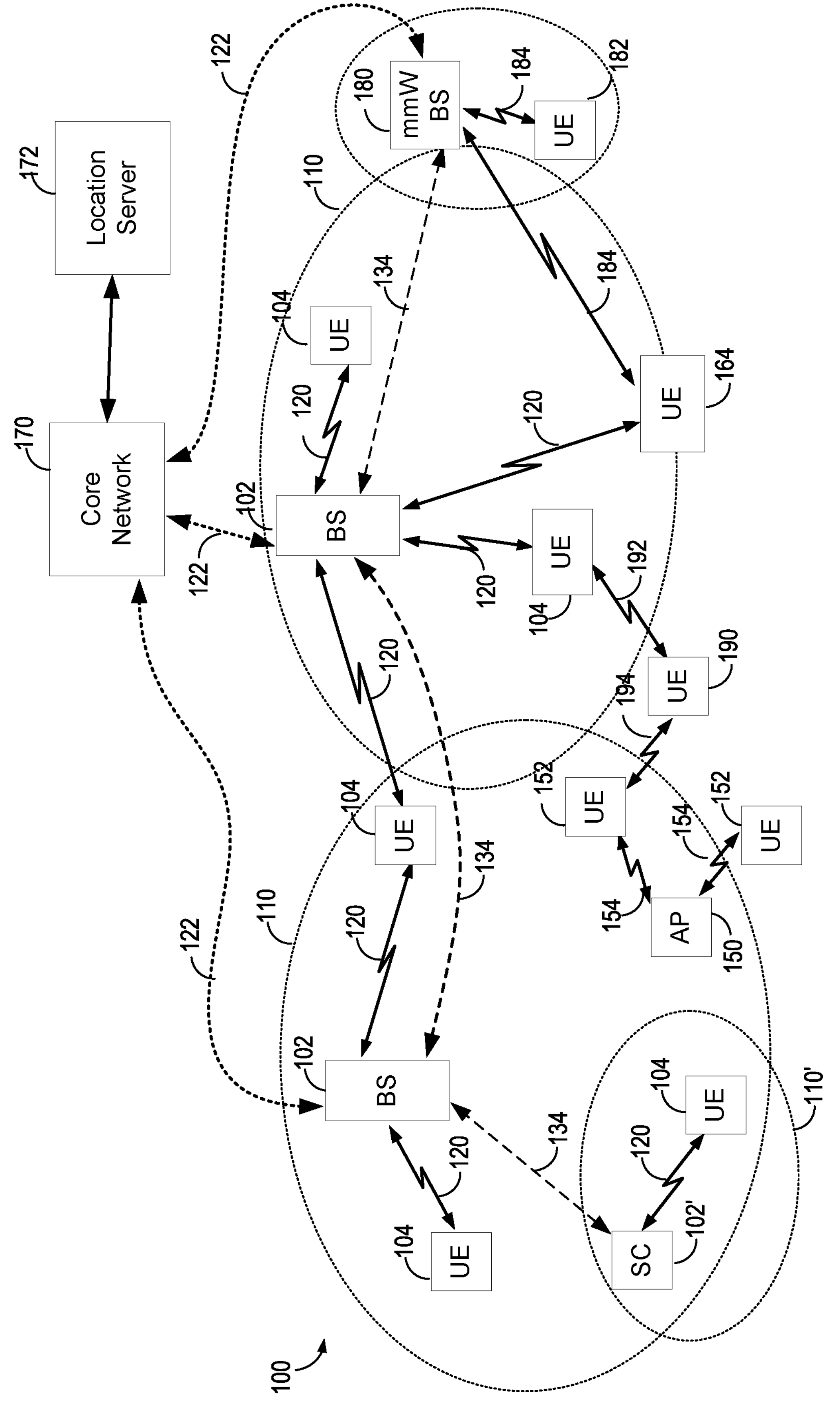
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. In some systems, a base station may correspond to a Customer Premise Equipment (CPE) or a road-side unit (RSU). In some designs, a base station may correspond to a high-powered UE (e.g., a vehicle UE or VUE) that may provide limited certain infrastructure functionality. A communication link through which UEs can send signals to a base station is called an uplink (UL) channel (e.g., a reverse traffic channel, a reverse control channel, an access channel, etc.).

A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNB s where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
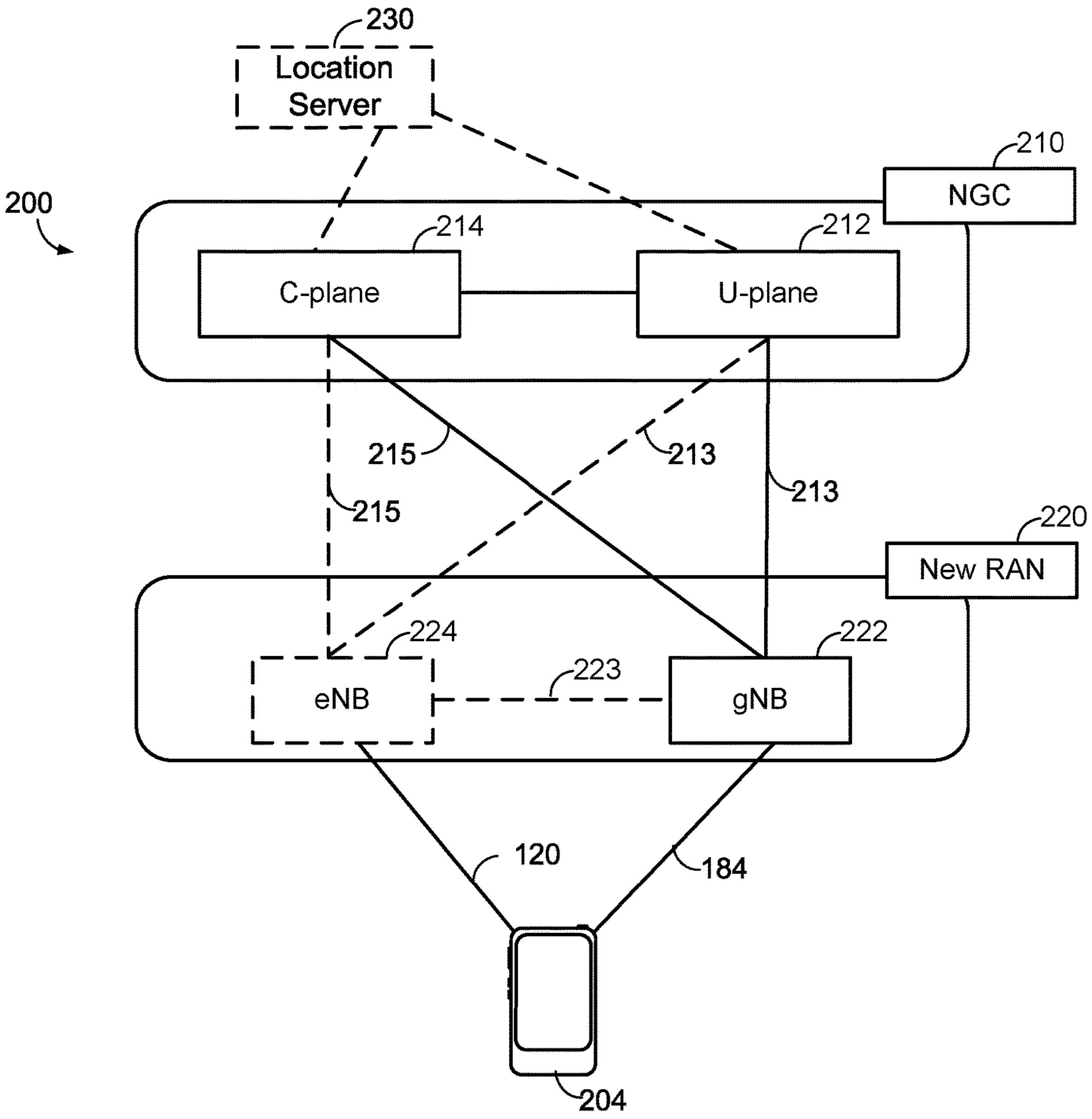
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNB s 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
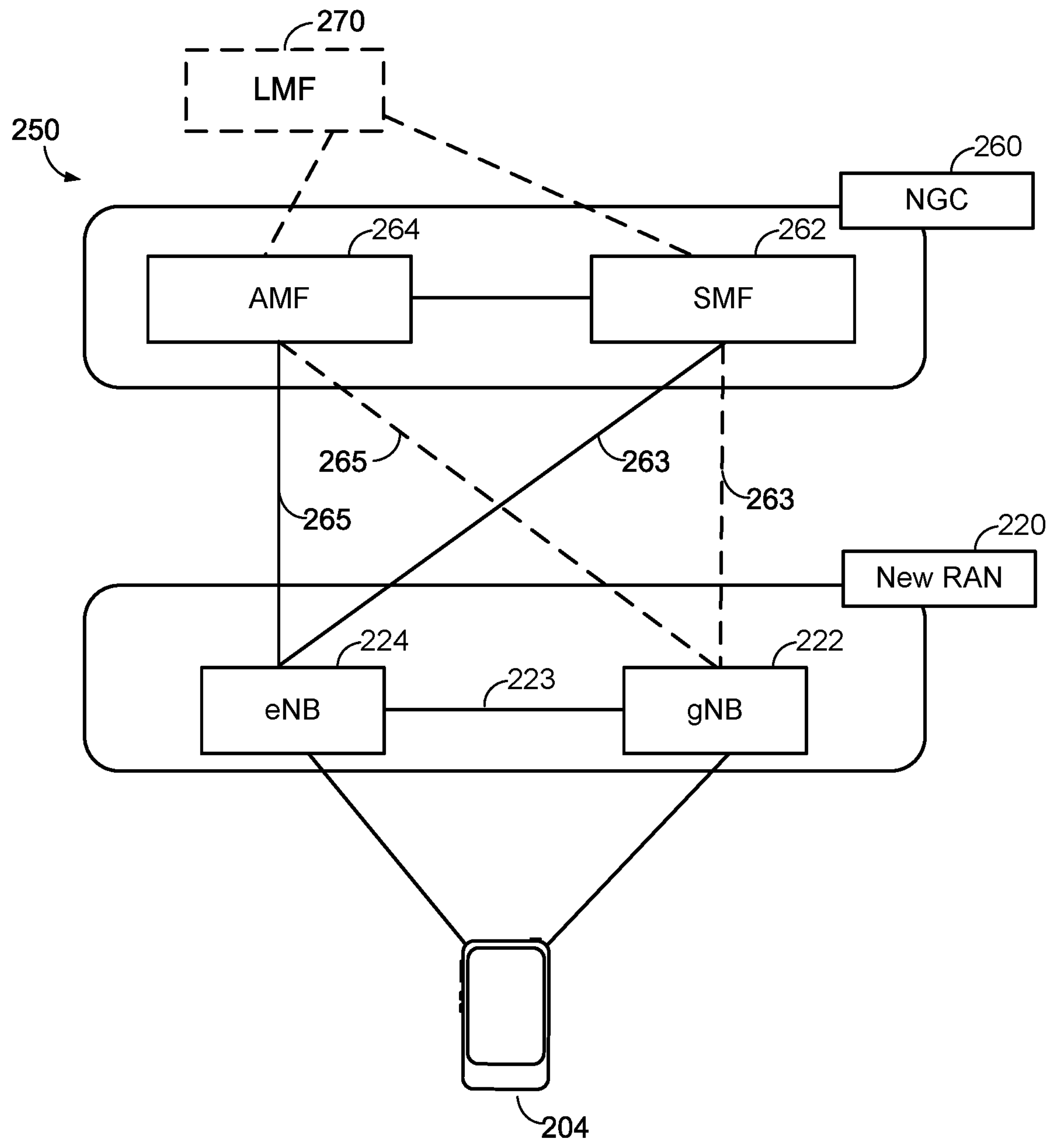

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNB s 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE

204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
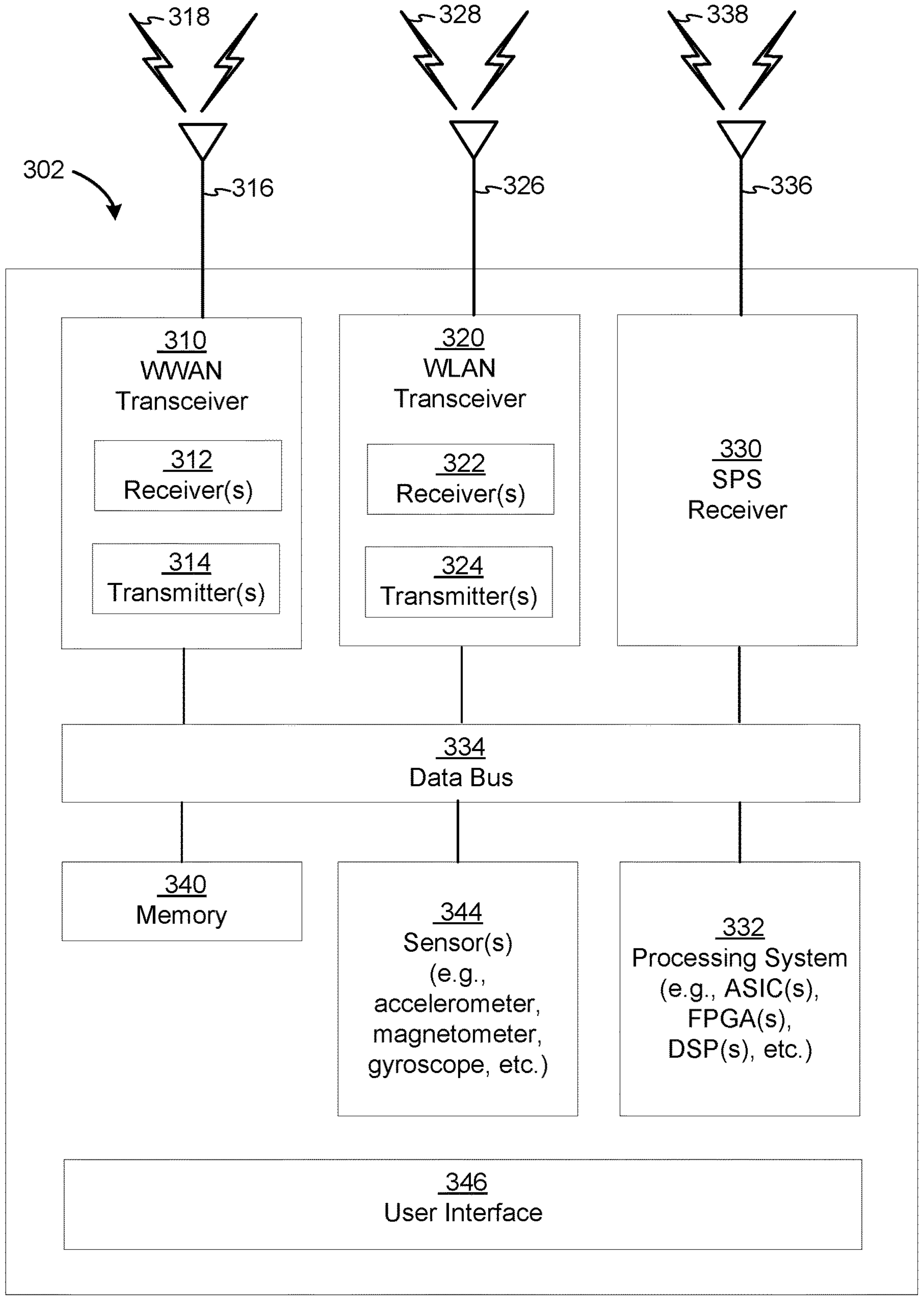
FIGS. 3A to 3C are simplified block diagrams of several sample aspects of components that may be employed in wireless communication nodes and configured to support communication as taught herein.
Figure 3B:
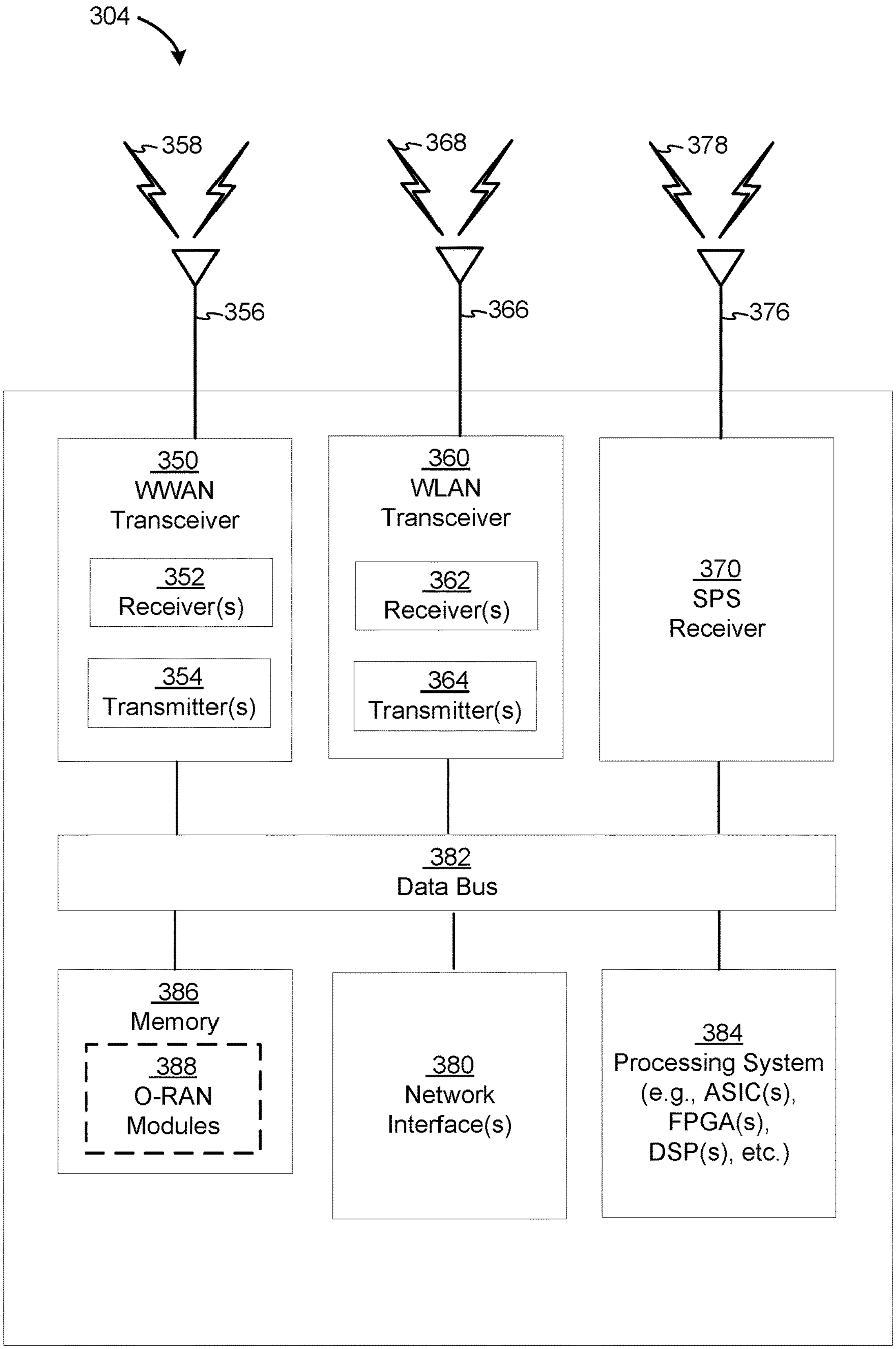
Figure 3C:
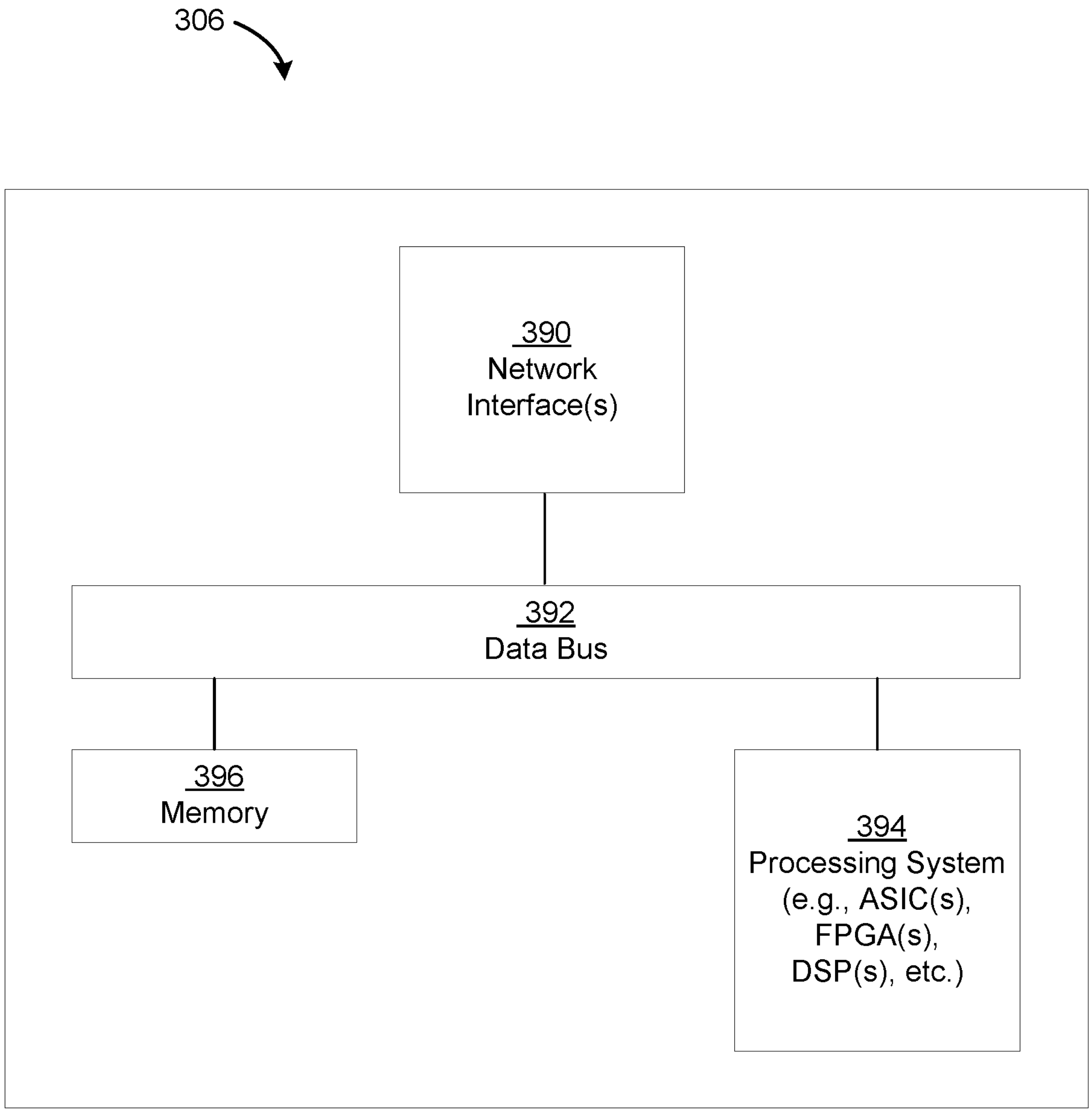

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, false base station (FBS) detection as disclosed herein and for providing other processing functionality. The base station 304 includes a processing system 384 for providing functionality relating to, for example, FBS detection as disclosed herein and for providing other processing functionality. The network entity 306 includes a processing system 394 for providing functionality relating to, for example, FBS detection as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatus 304 may include a set of open RAN (O-RAN) modules 388, such as an O-RAN CU (O-CU), an O-RAN distributed unit (O-DU), and one or more O-RAN radio units (O-RUs). The O-RAN modules 388 may be hardware circuits that are part of or coupled to the processing system 384, that, when executed, cause the apparatuses 304 to perform the functionality described herein. Alternatively, the O-RAN modules 388 may be memory modules (as shown in FIG. 3B) stored in the memory component 386 that, when executed by the processing system 384, cause the apparatus 304 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 389 may be implemented by processor and memory component(s) of the base station 304 (e.g., by execution of appropriate code and/or by appropriate configuration of processor components). Also, some or all of the functionality represented by blocks 390 to 396 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the O-RAN modules 388, etc.

Figure 4:
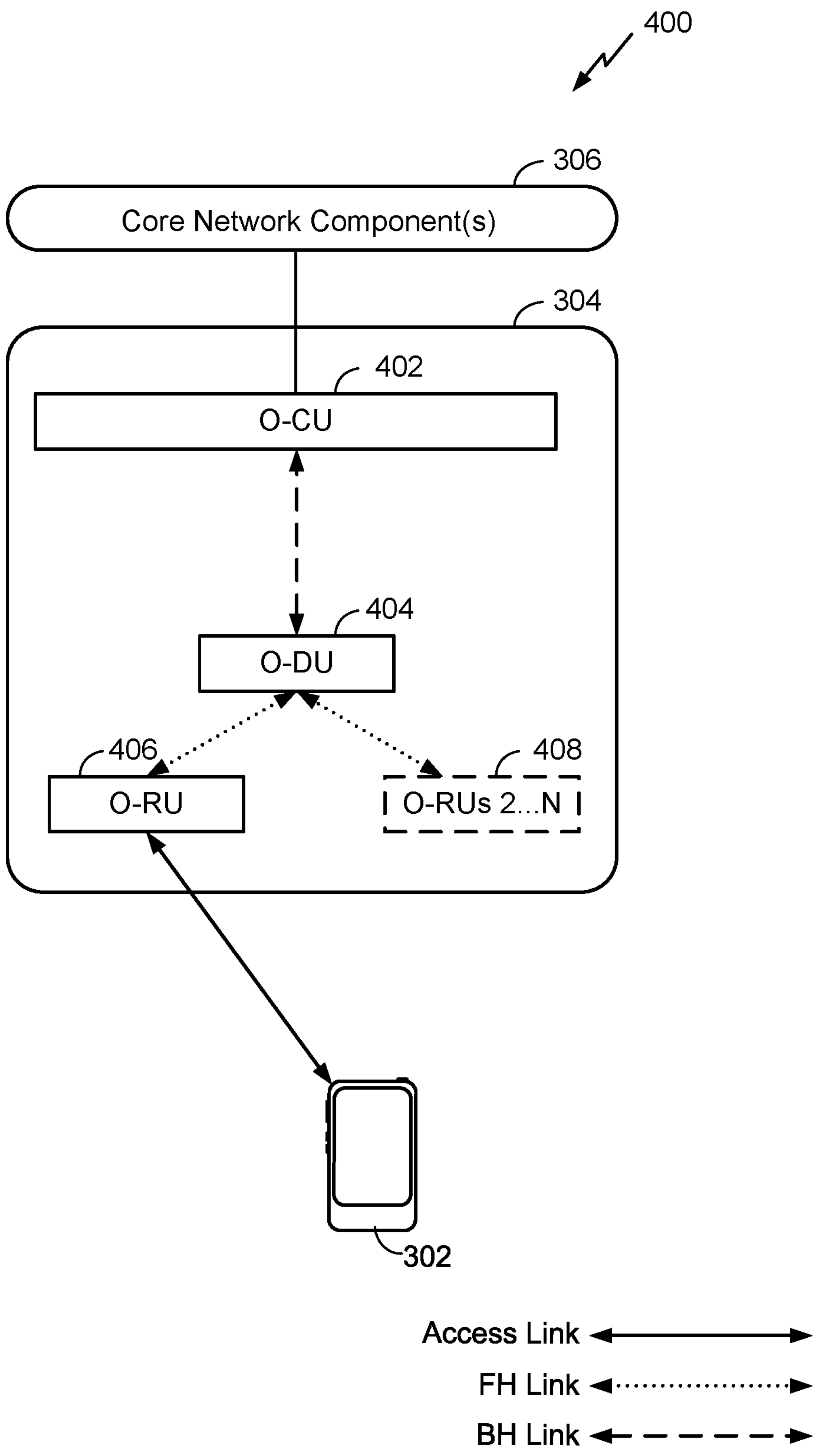
FIG. 4 illustrates an open RAN (O-RAN) in accordance with aspects of the disclosure.

FIG. 4 illustrates an open RAN (O-RAN) 400 in accordance with aspects of the disclosure. The O-RAN 400 can include one or more central units (CUs) 402 that can provide a connection to a core network, such as NGC 210 of FIG. 2A or NGC 260 of FIG. 2B. The CU 402 can communicate with one or more DUs 404, where a DU can be provided at a base station or gNB (e.g., BS 304) and can provide some network functions, such as RLC, MAC, higher layer PHY, etc. functions. A DU 404 can communicate with one or more RUs 406-408 to provide lower layer network functions, such as lower layer PHY and/or RF functions. Thus, the one or more RUs 406-408 can provide direct RF connection with one or more UEs 302 or other nodes. In some designs, the CU(s) 402, DU(s) 404 and RU(s) 406-408 are implemented as logical components of the BS 304, while in other designs some or all of the CU(s) 402, DU(s) 404 and RU(s) 406-408 may be supported with dedicated or component-specific hardware.

In an example, the CU 402 can include a wireline connection to a network (e.g., one or more backend network components, such as network entity 306 of FIG. 3C, NGC 210 of FIG. 2A or NGC 260, etc.). The DU 404 can communicate with a CU 402 over a backhaul (BH) link, the RU 406 can communicate with a DU 404 over a front haul (FH) link, and UE 302 can communicate with RU 406 over an access link. In the FH link, the DU 404 and RU 406 can use an FH interface to communicate certain messages, which can include section type messages (e.g., section type 1 messages, section type 3 messages, other messages, etc.). The DU 404 and RU 406 can communicate control plane (C-Plane) messages indicating parameters for user plane (U-Plane) messages, where the U-Plane messages can carry downlink communications from core network nodes that are intended for a UE 302, uplink messages from the UE 302 that are intended for core network nodes, etc.

Referring to FIG. 4, the CUs, DUs, and RUs may alternatively be referred to as O-RAN CUs (O-CUs), O-RAN DUs (O-DUs) and O-RAN RUs (O-RUs). In some designs, the U-Plane can carry uplink data (e.g., PRACH, PUSCH, sounding reference signal (SRS), etc.) of the UE from the RU to the DU, and U-Plane can carry downlink data of a C-Plane, gNB, core network nodes, etc. from the DU to the RU. In addition, for example, a CU can provide additional higher layer network support, such as radio resource control (RRC) or packet data convergence protocol (PDCP) layer support, and may facilitate communications with one or more core networks (e.g., a 5G core, evolved packet core, etc.).

When considering the functional split defining a fronthaul (FH) interface there are two competing interests:

There is a benefit in keeping an O-RU as simple as possible because size, weight, and power draw are primary deciding considerations and the more complex an O-RU, the larger, heavier and more power-hungry the O-RU tends to be;

There is a benefit in having the interface at a higher level which tends to reduce the interface throughput relative to a lower-level interface—but the higher-level the interface, the more complex the O-RU tends to be.

To resolve this conundrum, O-RAN has selected a single split point, known as "7–2x" but allows a variation, with the precoding function to be located either in the O-DU or in the O-RU. For the most part the interface is not affected by this decision, but there are some impacts namely to provide the necessary information to the O-RU to execute the precoding operation. O-RUs within which the precoding is not done (therefore of lower complexity) are called "Category A" O-RUs while O-RUs within which the precoding is done are called "Category B" O-RUs.

The inclusion of these two O-RU categories has certain implications for the LTE and NR functional splits in both DL and UL. In particular, for a Category B O-RU to implement precoding for LTE TM2-TM4, some special Control Plane (C-Plane) instructions need to be provided to the O-RU from the O-DU. For LTE TM5-10 and NR, no special instructions are needed because the precoding may be included in a digital beamforming processing block within the O-RU for a Category B O-RU (even for analog beamforming O-RUs), while for a Category A O-RU, the precoding would be executed in the O-DU and any beamforming in the O-RU, if present, would exclude the precoding calculation.

In some designs, O-RU Category B is used with modulation compression, a separate section has to be created for symbols with reference signals (e.g. DM-RS, PT-RS, CSI-RS) because those reference signals could have different beamforming (including precoding) and/or scaling factor.

Figure 5:
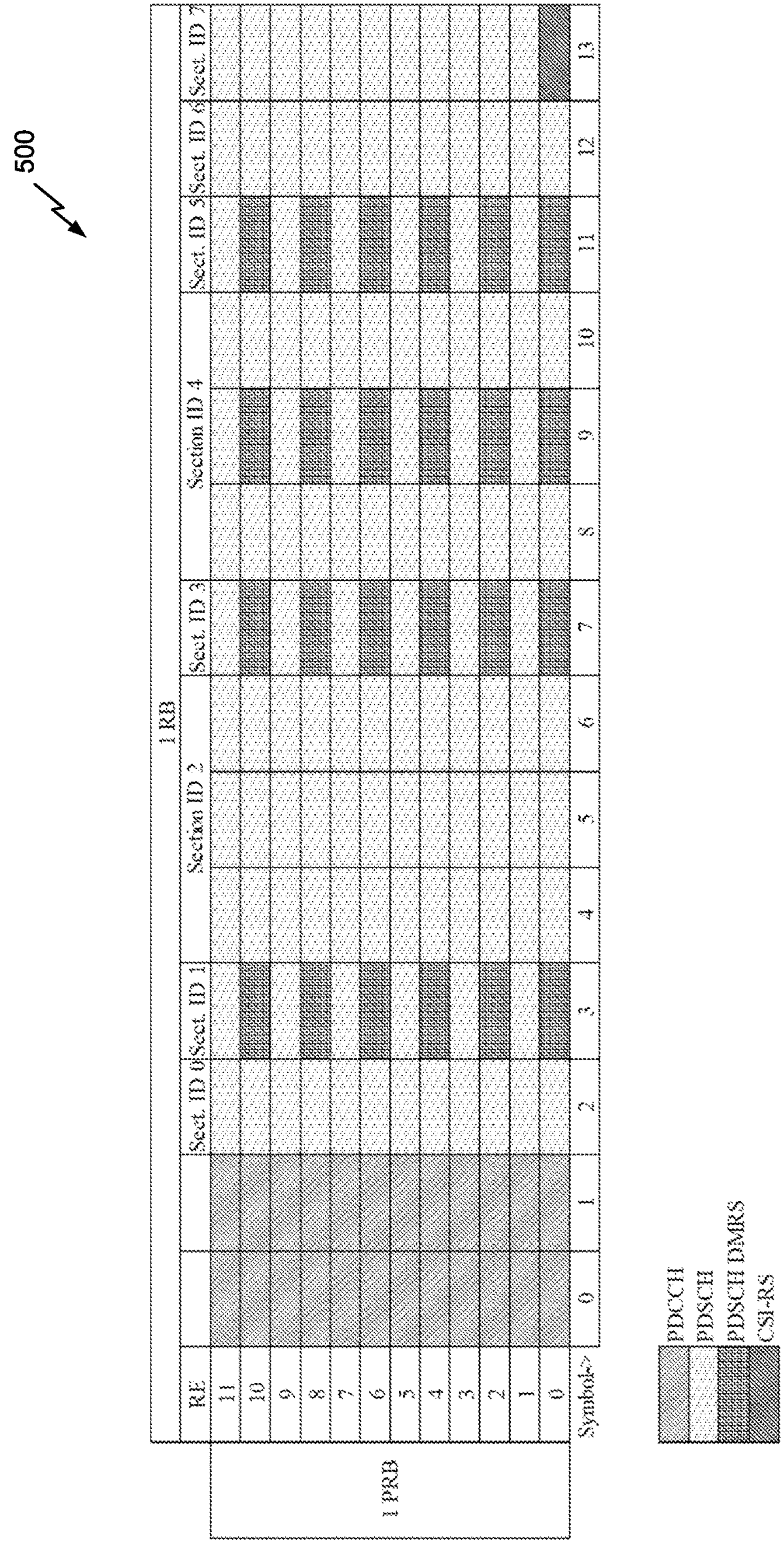
FIG. 5 illustrates a C-Plane message resource configuration in accordance with an aspect of the disclosure.

FIG. 5 illustrates a C-Plane message resource configuration 500 in accordance with an aspect of the disclosure. Due to DM-RS located at symbols 3, 7 and 11, a total of 8 section IDs 0 . . . 7 are used. For Section IDs 1, 3, 5 and 17 where PDSCH and DM-RS (or CSI-RS) coexist, there are 2 different section instances. This situation would become worse when there are multiple PDSCH allocations multiplexed in frequency-domain within the slot. A higher number of section instances generally tends to (1) creates unnecessary C-Plane message overhead, and (2) requires more time for low-cost O-RUs to finish C-Plane message processing with modulation compression.

One or more aspects of the disclosure is thereby directed to a C-Plane message that specifies common physical resource block (PRB) information associated with a plurality of RSs (e.g., phase tracking RS (PT-RS), DM-RS, CSI-RS, etc.). Such aspects may provide various technical advantages, including reduction to C-Plane overhead and reducing C-plane message processing time, particularly where modulation compression is implemented with respect to Category B O-RUs.

Figure 6:
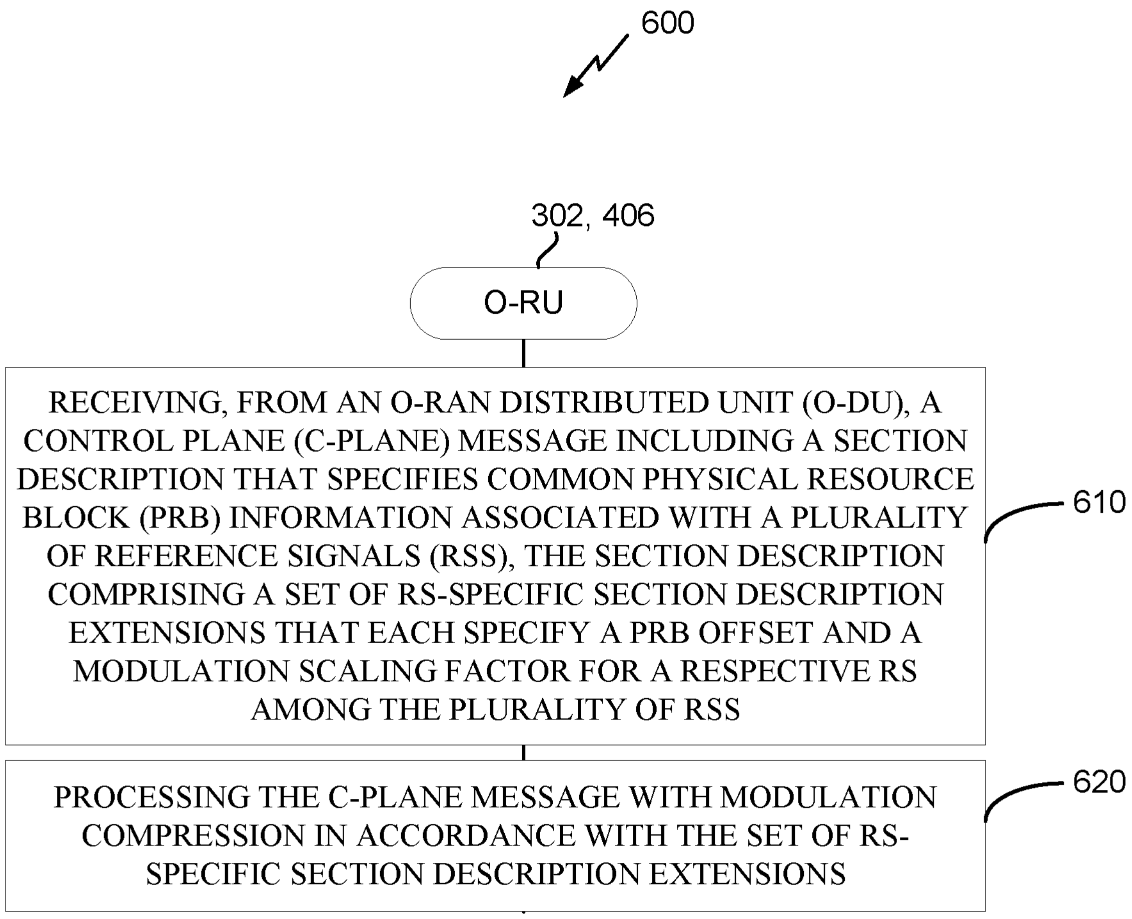
FIG. 6 illustrates a process of wireless communication, according to aspects of the disclosure.

FIG. 6 illustrates an exemplary process 600 of wireless communication, according to aspects of the disclosure. In an aspect, the process 600 may be performed by an O-RU, such as O-RU 406 of FIG. 4 which may be integrated as part of BS 304 of FIG. 3B in some designs. In particular, the O-RU performing the process 600 of FIG. 6 corresponds to a Category B O-RU that supports modulation compression.

At 610, the O-RU 406 (e.g., processing system 384, data bus 382, network interface(s) 380, etc.) receives, from an from an O-DU, a C-Plane message including a section description that specifies common PRB information associated with a plurality of RSs, the section description comprising a set of RS-specific section description extensions that each specify a PRB offset and a modulation scaling factor for a respective RS among the plurality of RSs.

At 620, the O-RU 406 (e.g., processing system 384, etc.) processes the C-Plane message with modulation compression in accordance with the set of RS-specific section description extensions.

Figure 7:
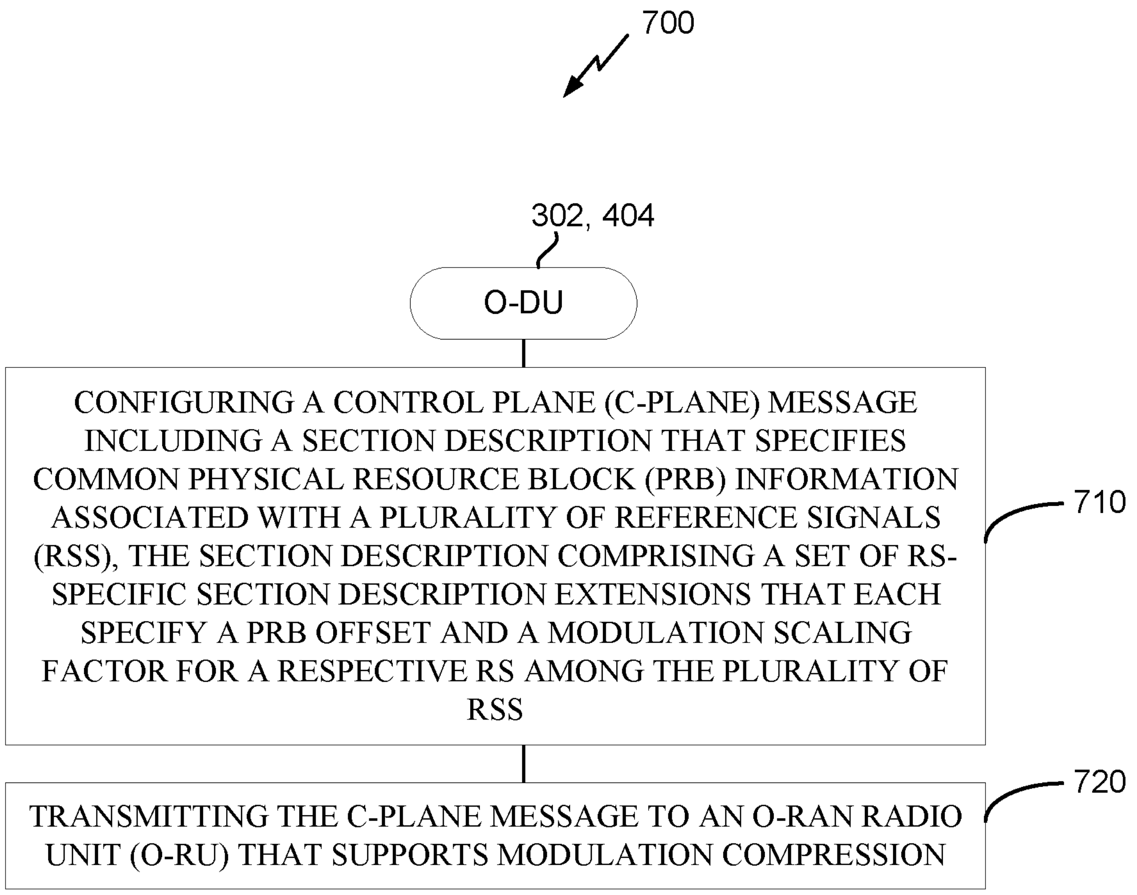
FIG. 7 illustrates a process of wireless communication, according to aspects of the disclosure.

FIG. 7 illustrates an exemplary process 700 of wireless communication, according to aspects of the disclosure. In an aspect, the process 700 may be performed by an O-DU, such as O-DU 404 of FIG. 4 which may be integrated as part of BS 304 of FIG. 3B in some designs.

At 710, the O-DU 404 (e.g., processing system 384, etc.) configures a C-Plane message including a section description that specifies common PRB information associated with a plurality of RSs, the section description comprising a set of RS-specific section description extensions that each specify a PRB offset and a modulation scaling factor for a respective RS among the plurality of RSs.

At 720, the O-DU 404 (e.g., processing system 384, data bus 382, network interface(s) 380, etc.) transmits the C-Plane message to an O-RU that supports modulation compression (e.g., Category B O-RU).

Various implementation examples of the processes 600-700 of FIGS. 6-7 will now be described in detail. To provide context with respect to these implementation examples, FIG. 8 illustrates a conventional C-Plane message configuration 800. Particular attention is drawn to fields denoted as 802, which comprise startPrbc and a numPrbc fields for a respective Section ID. In various aspects, instead of including the fields 802 redundantly for reach RS type in the C-Plane message as in FIG. 8, multiple RS types (e.g., DM-RS, PT-RS, CSI-RS, SRS, etc.) may be mapped to common PRB information, such as the start (startPrbc field) and end (indicated by startPrbc and numPrbc fields together) of PRBs for the PDSCH or PUSCH. In this case, section description extensions can be provided in case of modulation compression that each specify a PRB offset and a modulation scaling factor for a respective RS among the plurality of RSs.

FIG. 9 illustrates a C-Plane message configuration 900 in accordance with an aspect of the disclosure. In some designs, the C-Plane message configuration 900 may be used as part of the C-Plane message described with respect to the processes 600-700 of FIGS. 6-7.

Referring to FIG. 9, a 2-word extension includes information for a single RS type—e.g., start PRB offset, PRB step, RE mask, symbol mask, constellation shift (csf), and modulation compression scaler, whereby:

- 'startPrbcOffset' indicates the PRB offset from startPrbc in section description.
- 'stepPrbc' indicates every how many PRBs this extension is applicable. For non-contiguous PRB allocations by extension type 6, this PRB step size is interpreted as the contiguous number of PRBs within the allocated PDSCH/PUSCH frequency PRBs, not the number of common resource blocks (CRBs). For contiguous PRB allocations, the step size can be seen as number of CRBs.
- 'reMask' indicates to which REs this extension is applicable.
- 'symbolMask' indicates to which symbols this extension is applicable.
- 'csf' indicates whether to shift the constellation or not (e.g., same as the one in extension type 4 or 5).
- 'modCompScaler' indicates the scaling factor to apply to the unshifted constellation (e.g., same as the one in extension type 4 or 5).

In some designs, the example extension depicted in FIG. 9 is suitable for DM-RS and PT-RS signaling, but not for CSI-RS. In some designs, the example extension depicted in FIG. 9 does not require extensions type 4 or 5 for modulation compression scaler. Also, it will be appreciated that the particular field arrangement (or order) may vary by implementation.

FIG. 10 illustrates a C-Plane message configuration 1000 in accordance with another aspect of the disclosure. In some designs, the C-Plane message configuration 1000 may be used as part of the C-Plane message described with respect to the processes 600-700 of FIGS. 6-7. The C-Plane message configuration 1000 is similar to the C-Plane message configuration 900 of FIG. 9, except that the fields startPrbc and stepPrbc are depicted with different bitwidths to demonstrate that different variations are possible. Also, it will be appreciated that the particular field arrangement (or order) may vary by implementation.

Figure 11:
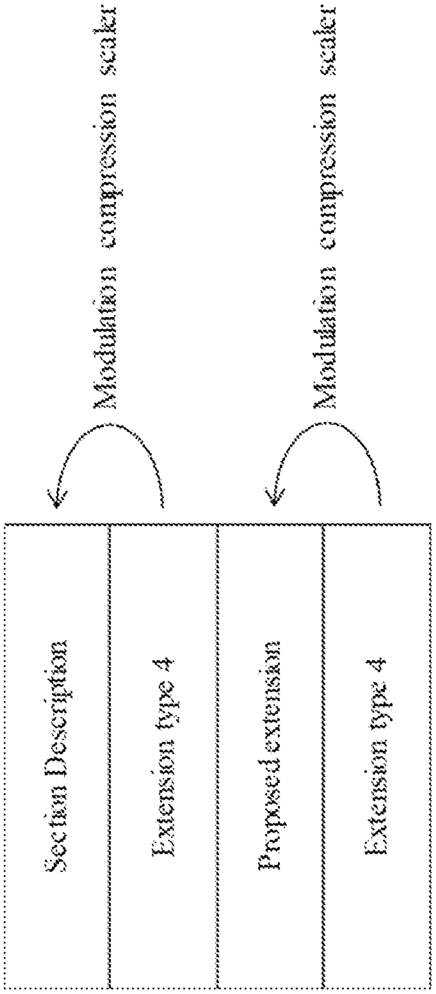
FIG. 11 illustrates a C-Plane message configuration in accordance with another aspect of the disclosure.

FIG. 11 illustrates a C-Plane message configuration 1100 in accordance with another aspect of the disclosure. In some designs, the C-Plane message configuration 1100 may be used as part of the C-Plane message described with respect to the processes 600-700 of FIGS. 6-7. The C-Plane message configuration 1100 is similar to the C-Plane message configurations 900 of FIG. 9 and 1000 of FIG. 10, except that the fields startPrbc and stepPrbc are depicted with different bitwidths to demonstrate that different variations are possible. Also, it will be appreciated that the particular field arrangement (or order) may vary by implementation.

FIG. 12 illustrates a C-Plane message configuration 1200 in accordance with an aspect of the disclosure. In some designs, the C-Plane message configuration 1200 may be used as part of the C-Plane message described with respect to the processes 600-700 of FIGS. 6-7.

Referring to FIG. 12, a 3-word extension includes information for a single RS type—e.g., start PRB offset, PRB step, RE mask, symbol mask, beam ID, constellation shift (csf), and modulation compression scaler.

- 'startPrbcOffset' indicates the PRB offset from startPrbc in section description.
- 'stepPrbc' indicates every how many PRBs (or CRBs) to which this extension is applicable.
- 'reMask' indicates to which REs this extension is applicable.
- 'symbolMask' indicates to which symbols this extension is applicable.
- 'beamId' indicates the beamforming ID.
- 'csf' indicates whether to shift the constellation or not (e.g., same as the one in extension type 4 or 5)
- 'modCompScaler' indicates the scaling factor to apply to the unshifted constellation (e.g., same as the one in extension type 4 or 5)

In some designs, the example extension depicted in FIG. 12 is extension is suitable for DM-RS, PT-RS, and CSI-RS for DL (or SRS for UL). In some designs, the example extension depicted in FIG. 12 does not require extension type 4 or 5 for modulation compression scaler. In some designs, the example extension depicted in FIG. 12 may not be used along with non-contiguous PRB allocations using extension type 6.

Referring to FIGS. 9-1, in some designs, the following field interpretations may be used, e.g.:

- {startPrbcOffset, stepPrbc}: If startPrbcOffset and stepPrbc have the same bitwidth, then it may be assumed that stepPrbc ranges from 0 to 2^N−1 and startPrbcOffset ranges from 0 to stepPrbc−1, where N is the number of bits for startPrbcOffset and stepPrbc. Else, if stepPrbc bitwidth is greater than startPrbcOffset, then startPrbcOffset can be defined as a subset of {0, 1, 2, . . . stepPrbc−1}.
- reMask: 12 bit representing the 12 REs per PRB in frequency domain (same as the one in Section Description).
- symbolMask: 14 bit representing the 14 symbols per NR slot in time domain.
- beamId: 15 bit index (e.g., same as the one in Section Description).
- 'csf': 1 bit indicator (e.g., same as the one in extension type 4 or 5).
- 'modCompScaler': 15 bit value (e.g., same as the one in extension type 4 or 5).

In some designs, the various extensions described with respect to FIGS. 9-12 may interact with the transport header and section description associated with the C-Plane message configuration 800 in various ways. For example, 'startSymbolid' may define the earliest symbol that 'symbolMask' in the various extensions described with respect to FIGS. 9-12 can be set to 1. In some designs, a symbol number which is earlier than startSymbolid shall not be set to 1. In some designs, 'rb' can be set to 0 or 1. In some designs, the base PRBs are defined as per startPrbc', 'numPrbc', and 'rb'. In some designs, for 'rb=0', all PRBs from startPrbc to startPrbc+numPrbc−1 are used. In some designs, for 'rb=1', PRBs {startPrbc, startPrbc+2, startPrbc+4, . . . , startPrbc+2*(numPrbc−1)} are used. In some designs, 'symInc' and 'numSymbol' need not be used (e.g., these values can be set for other sections).

In some designs, the various extensions described with respect to FIGS. 9-12 may interact with other extension types in various ways. For example, extension type 4 (e.g., single modulation compression scaler) need not be used in some designs due to the presence of modulation compression scaler). In another example, extension type 5 (e.g., multiple modulation compression scalers) need not be used in some designs due to the presence of modulation compression scaler). In some designs, the various extensions described with respect to FIGS. 9-11 may be compatible with extension type 6. For example, extension type 6 defines the overall PDSCH/PUSCH resources including DM-RS/PT-RS, and the various extensions described with respect to FIGS. 9-11 may specify the RS locations additionally.

In some designs, the extension described with respect to FIG. 12 may include support of CSI-RS for DL (or SRS for UL) of which resource allocation is independent of PDSCH in DL or PUSCH in UL. Therefore, 'stepPrbc' may be defined in number of PDSCH (or PUSCH) PRBs, not number of CRBs, in which case the extension described with respect to FIG. 12 may be limited to contiguous PRB allocations in some implementations.

The C-Plane message described above with respect to FIGS. 6-7 and the specific configuration examples described above with respect to FIGS. 9-12 may result in C-Plane overhead savings between the O-DU 404 and O-RU 406. Assuming N PDSCH allocations, an example of the overhead savings is summarized in Table 1 as follows:

TABLE 1

| | CUS V3 based with extension type 4 only | CUS V3 based with extension type 4 & 5 | CUS V3 based with extension type 4 & 6 | CUS V3 based with extension type 4 & 5 & 6 | Extension of FIGS. 9-11 | Extension of FIG. 12 |
|---|---|---|---|---|---|---|
| # of section IDs | 8*N | 8*N | 5*N | 5*N | 2*N | 1*N |
| # of section instances | 12*N | 9*N | 9*N | 6*N | 2*N | 1*N |
| # of H extensions | 12*N | 9*N | 10*N | 7*N | 4*N | 3*N |
| # of bytes for C-Plane message (excluding transport header) | 6 + 144*N | 6 + 132*N | 6 + 116*N | 6 + 104*N | 6 + 40*N | 6 + 36*N |

At 1410, the first O-RAN unit (e.g., processing system 384, etc.) determines to transmit a message to a second O-RAN unit that is associated with combining across symbols at an O-RU (e.g., a Category B O-RU that supports modulation compression). In some designs, the first O-RAN unit corresponds to the O-RU, and the second O-RAN unit corresponds to the O-DU. In this case, the message specifies whether the O-RU is capable of combining across symbols (e.g., a maximum number of consecutive symbols that the O-RU is capable of combining), and the O-RU may further receive a C-Plane message that specifies whether the O-RU is permitted to combine consecutive symbols and/or an indication of a maximum number of consecutive symbols for which combination is permitted. In other designs, the second O-RAN unit corresponds to the O-RU, and the first O-RAN unit corresponds to the O-DU. In this case, the message may specify whether the O-RU is permitted to combine consecutive symbols and/or an indication of a maximum number of consecutive symbols for which combination is permitted, and may be based on another message from the O-RU that specifies whether the O-RU is capable of combining across symbols (e.g., a maximum number of consecutive symbols that the O-RU is capable of combining).

At 1420, the first O-RAN unit (e.g., processing system 384, data bus 382, network interface(s) 380, etc.) transmits the message to the second O-RAN unit. In some designs, the first O-RAN unit transmits the message as an M-Plane message via M-Plane signaling, whereas in other designs, the first O-RAN unit transmits the message as a C-Plane message via C-Plane signaling.

Figure 15:
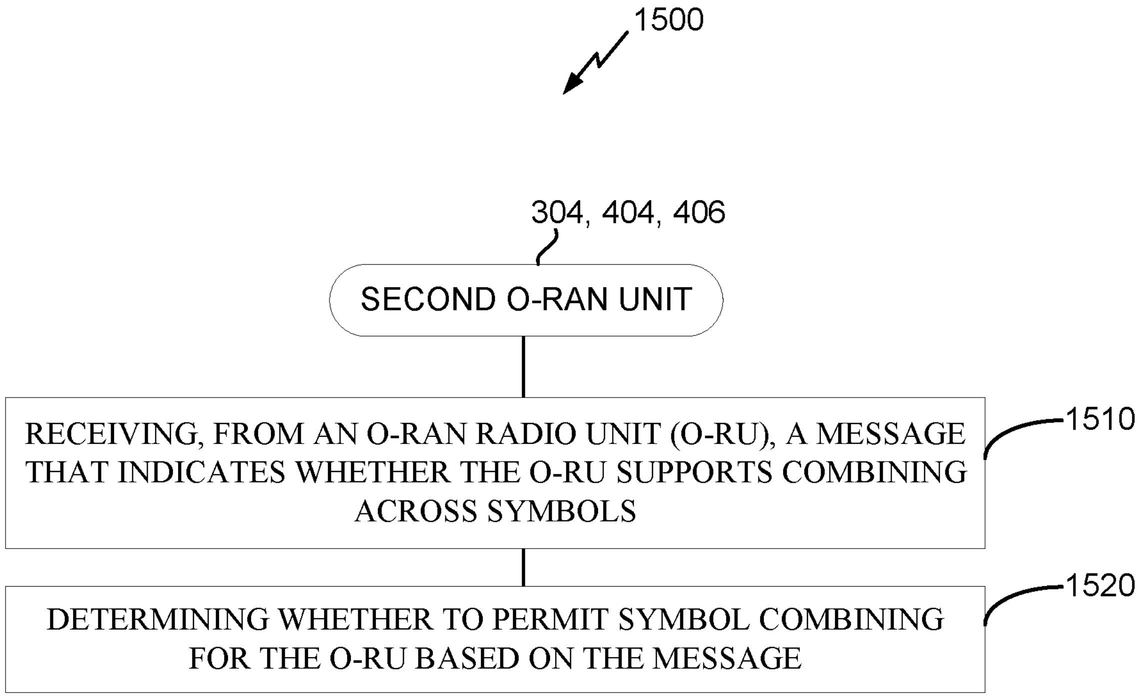
FIG. 15 illustrates a process of wireless communication, according to aspects of the disclosure.

FIG. 15 illustrates an exemplary process 1500 of wireless communication, according to aspects of the disclosure. In an aspect, the process 1500 may be performed by a second O-RAN unit, such as O-DU 404 or O-RU 406 of FIG. 4, either of which may be integrated as part of BS 304 of FIG. 3B in some designs.

At 1510, the second O-RAN unit (e.g., processing system 384, data bus 382, network interface(s) 380, etc.) receives, from a first O-RAN unit, a message that is associated with combining across symbols at an O-RU (e.g., a Category B O-RU that supports modulation compression). In some designs, the first O-RAN unit corresponds to the O-RU, and the second O-RAN unit corresponds to the O-DU. In this case, the message specifies whether the O-RU is capable of combining across symbols (e.g., a maximum number of consecutive symbols that the O-RU is capable of combin- FIG. 13 illustrates a Section Type 3 C-Plane message configuration 1300 in accordance with an aspect of the disclosure. As shown, the Section Type 3 C-Plane message configuration 1300 includes an 8-bit reserved field 1302. The Section Type 3 C-Plane message configuration 1300 may define configuration for a slot including a repetition of physical random access channel (PRACH) signals within a slot.

In some current systems, each repetition of PRACH signals within a slot based on Section Type 3 are sent to O-DU individually after the compression process. However, such a process consumes significant fronthaul (FH) throughput, and the detection performance could be degraded due to the quantization noise by compression. One or more aspects of the disclosure is thereby directed to a message (e.g., C-Plane or M-Plane message) associated with combining across symbols at an O-RU. For example, the message may correspond to a message from the O-RU to the O-DU that indicates a capability of the O-RU for combining across symbols, or a message from the O-DU to the O-RU that indicates whether combining across symbols is permitted for the O-RU. Such aspects may provide various technical advantages, including reduction to FH throughput overhead. For example, if the O-DU knows that the O-RU supports symbol combining, then symbol combining can be enabled so that PRACH signal repetitions need not be sent from the O-RU to the O-DU individually.

Figure 14:
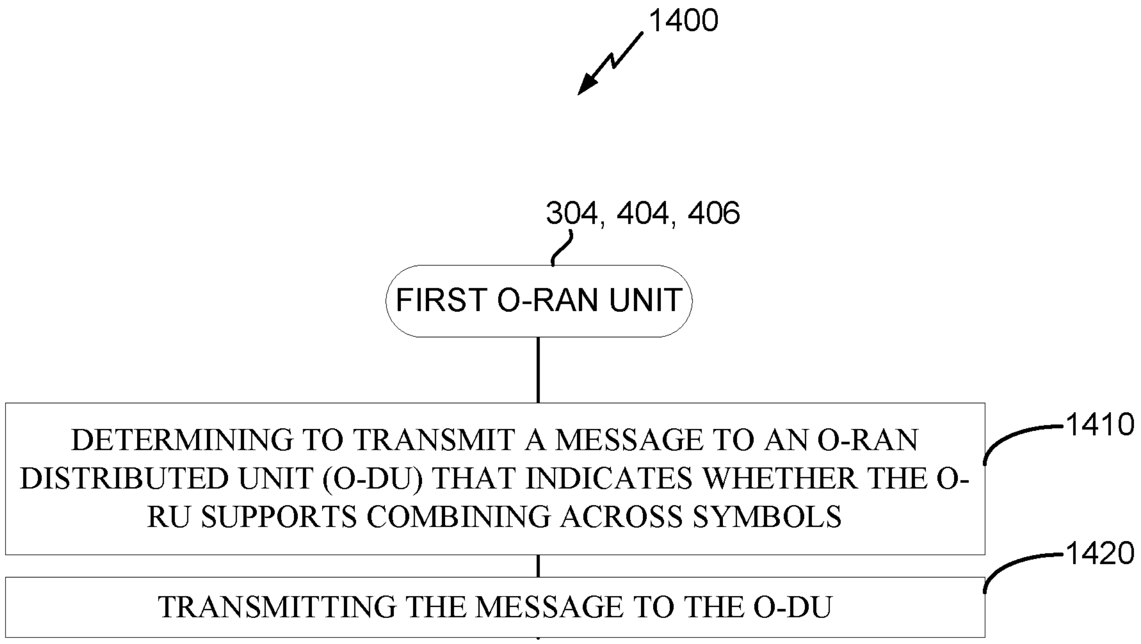
FIG. 14 illustrates a process of wireless communication, according to aspects of the disclosure.

FIG. 14 illustrates an exemplary process 1400 of wireless communication, according to aspects of the disclosure. In an aspect, the process 1400 may be performed by a first O-RAN unit, such as O-DU 404 or O-RU 406 of FIG. 4, either of which may be integrated as part of BS 304 of FIG. 3B in some designs.

ing), and the O-DU may further transmit a C-Plane message that specifies whether the O-RU is permitted to combine consecutive symbols and/or an indication of a maximum number of consecutive symbols for which combination is permitted. In other designs, the second O-RAN unit corresponds to the O-RU, and the first O-RAN unit corresponds to the O-DU. In this case, the message may specify whether the O-RU is permitted to combine consecutive symbols and/or an indication of a maximum number of consecutive symbols for which combination is permitted, and may be based on another message from the O-RU that specifies whether the O-RU is capable of combining across symbols (e.g., a maximum number of consecutive symbols that the O-RU is capable of combining). In some designs, the second O-RAN unit receives the message as an M-Plane message via M-Plane signaling, whereas in other designs, the second O-RAN unit receives the message as a C-Plane message via C-Plane signaling.

At 1520, the second O-RAN unit (e.g., processing system 384, data bus 382, network interface(s) 380, etc.) performs an action in response to the message. For example, the second O-RAN unit may correspond to the O-DU, in which case the action may include transmitting, to the O-RU in response to the message, a C-Plane message that specifies whether the O-RU is permitted to combine consecutive symbols and/or an indication of a maximum number of consecutive symbols for which combination is permitted. In another example, the second O-RAN unit may correspond to the O-RU, in which case the action may include performing symbol combining (e.g., PRACH symbol combining) as configured by the O-DU via the message.

Figure 16:
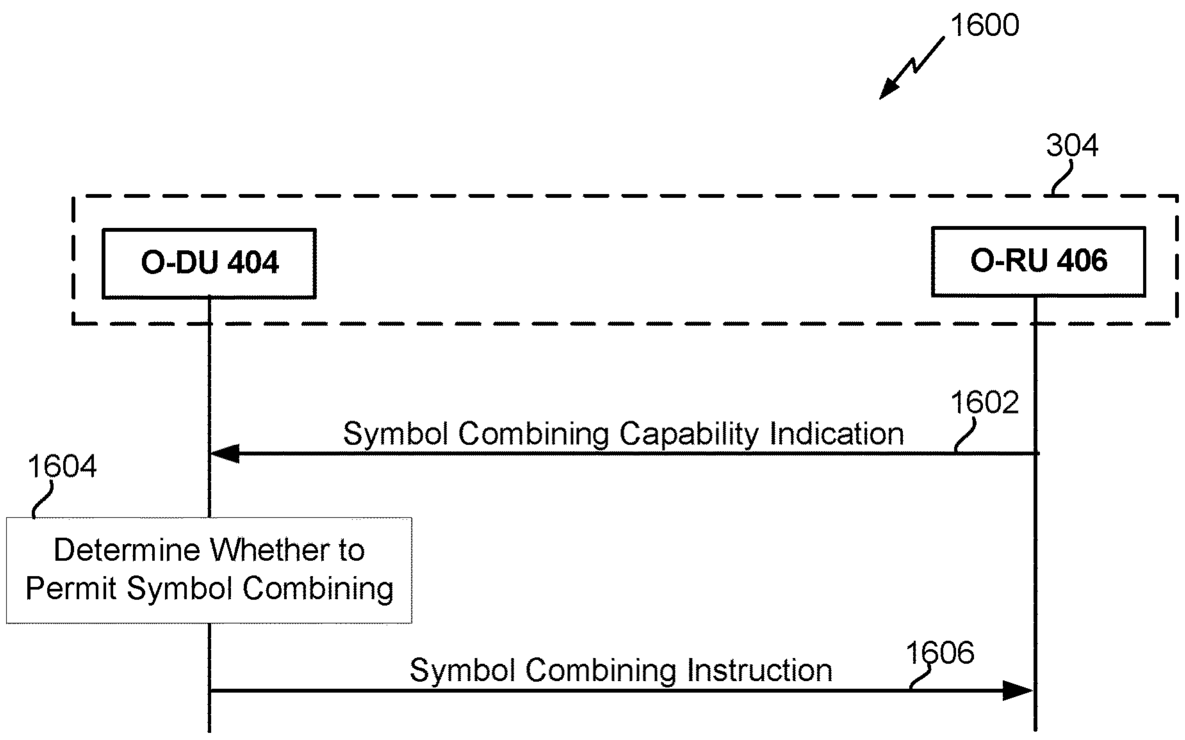
FIG. 16 illustrates an example implementation of the processes of FIGS. 14-15 in accordance with an aspect of the disclosure.

FIG. 16 illustrates an example implementation 1600 of the processes 1400-1500 of FIGS. 14-15 in accordance with an aspect of the disclosure. At 1602, the O-RU 406 transmits a symbol combining capability indication to the O-DU 404. At 1604, the O-DU 404 determines whether to (and/or an extent to which) permit symbol combining by the O-RU 406. At 1606, the O-DU 404 transmits a symbol combining instruction to the O-RU 406 (e.g., to indicate whether and/or an extent to which symbol combining by the O-RU 406 is permitted). In some designs, the message communicated in accordance with the processes 1400-1500 of FIGS. 14-15 corresponds to 1602, in which case the first O-RAN unit corresponds to O-RU 406 and the second O-RAN unit corresponds to O-DU 404. In other designs, the message communicated in accordance with the processes 1400-1500 of FIGS. 14-15 corresponds to 1606, in which case the first O-RAN unit corresponds to O-DU 404 and the second O-RAN unit corresponds to O-RU 406.

Referring to FIG. 16, in some designs, the transmission at 1602 may correspond to an M-Plane O-RU capability parameter (which may be denoted as combineAcrossSymbols (Type-Boolean)) to signal if combining across symbols is supported by the O-RU 406. In some designs, a parameter may be defined to indicate how many consecutive symbols can be combined at O-RU. For example, such a parameter may be denoted as maxConsecSymCombining to indicate a maximum number of consecutive symbols to capable of combining (from O-RU to O-DU) or a maximum number of consecutive symbols that the O-RU is permitted to combine (from O-DU to O-RU). In some designs, the signaling of maxConsecSymCombining parameter can be implemented in different ways.

In a first example, the O-RU 406 may advertise the maxConsecSymCombining parameter as an M-Plane capability parameter (e.g., default value could be 0). In some designs, the O-DU 404 may configure the maxConsecSymCombining via M-Plane configuration (e.g., can allow a range of symbols, such as 1-12 symbols). In some designs, maxConsecSymCombining from O-RU need not be the same as the maxConsecSymCombining configured by 0-DU (e.g., O-DU may limit the degree of symbol combining to some lower level in some designs).

In a second example, the maxConsecSymCombining parameter can be sent with a section header of a Section Type 3 C-Plane message. Alternatively, the maxConsecSymCombining parameter can be sent via section description of a Section Type 3 C-Plane message with the help of a section extension. For example, the O-DU 404 can configure a bit (denoted as combSym) that indicates whether symbols can be combined, or a group of bits (also denoted as maxConsecSymCombining) that indicates the maximum number of consecutive symbols that the O-RU 406 is permitted to combine. In some designs, maxConsecSymCombining from O-RU need not be the same as the maxConsecSymCombining configured by 0-DU (e.g., O-DU may limit the degree of symbol combining to some lower level in some designs).

FIG. 17 illustrates a Section Type 3 C-Plane message configuration 1700 in accordance with another aspect of the disclosure. In an example, the Section Type 3 C-Plane message configuration 1700 is an example configuration of the message from the communicated (e.g., from O-RU to the O-DU, or from the O-DU to the O-RU) in accordance with the processes 1400-1500 of FIGS. 14-15. In FIG. 17, the 8-bit reserved field 1302 of FIG. 13 is replaced with fields 1702, whereby the fields 1702 include a single-bit combSym field and a 7-bit reserved field. Hence, one of the 8 reserved bits from the 8-bit reserved field 1302 of FIG. 13 is repurposed to provide the symbol combining indication, while 7 bits remain reserved.

FIG. 18 illustrates a Section Type 3 C-Plane message configuration 1800 in accordance with another aspect of the disclosure. In an example, the Section Type 3 C-Plane message configuration 1800 is an example configuration of the message communicated (e.g., from O-RU to the O-DU, or from the O-DU to the O-RU) in accordance with the processes 1400-1500 of FIGS. 14-15. In FIG. 18, the 8-bit reserved field 1302 of FIG. 13 is replaced with fields 1802, whereby the fields 1702 include a 4-bit maxConsecSymCombining field and a 4-bit reserved field. Hence, 4 bits from the 8-bit reserved field 1302 of FIG. 13 are repurposed to provide the maximum symbol combining indication, while 4 bits remain reserved. In other designs, the maxConsecSymCombining field may include a different number of bits (e.g., anywhere between 2-8 bits).

In an example, a default value for maxConsecSymCombining field may be 0 (e.g., a symbol may be combined with 0 other symbols, which means symbol combining is not permitted). If a non-zero value is configured, the symbols equal to maxConsecSymCombining may be combined with a symbol in frequency domain and sent via U-plane message. If maxConsecSymCombining is not a multiple of numSymbol, a last combining operation may have symbols lower than maxConsecSymCombining. In some designs, maxConsecSymCombining in section header must be less than numSymbol configured in the associated section header.

FIG. 19 illustrates a section extension of a Section Type 3 C-Plane message configuration 1900 in accordance with an aspect of the disclosure. In FIG. 19, the indication of the O-RU symbol combining indication may be made part of a section extension of a C-Plane message, rather than a section header of the C-Plane message as in FIGS. 17-18. In an example, this section extension can be used with existing C-plane sections. In some designs, the presence of this section extension would mean, O-RU should combine (or is capable of combining) the symbols described by the associated section. In some designs, if maxConsecSymCombining is not a multiple of numSymbol, a last combining operation should have symbols lower than maxConsecSymCombining. In some designs, maxConsecSymCombining in section extension must be less than numSymbol configured in the associated section header.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Clause 1. A method of operating an open radio access network (O-RAN) radio unit (O-RU), comprising: receiving, from an O-RAN distributed unit (O-DU), a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and processing the C-Plane message with modulation compression in accordance with the set of RS-specific section description extensions.

Clause 2. The method of clause 1, wherein at least one RS-specific section description extension of the set of RS-specific section description extensions further specifies beamforming information for the respective RS.

Clause 3. The method of any of clauses 1 to 2, wherein the plurality of RSs comprises a phase tracking RS (PT-RS), a demodulation RS (DM-RS), a channel state information RS (CSI-RS), a sounding reference signal (SRS), or a combination thereof.

Clause 4. A method of operating an open radio access network (O-RAN) distributed unit (O-DU), comprising: configuring a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and transmitting the C-Plane message to an O-RAN radio unit (O-RU) that supports modulation compression.

Clause 5. The method of clause 4, wherein at least one RS-specific section description extension of the set of RS-specific section description extensions further specifies beamforming information for the respective RS.

Clause 6. The method of any of clauses 4 to 5, wherein the plurality of RSs comprises a phase tracking RS (PT-RS), a demodulation RS (DM-RS), a channel state information RS (CSI-RS), a sounding reference signal (SRS), or a combination thereof.

Clause 7. A method of operating a first open radio access network (O-RAN) unit, comprising: determining to transmit a message to a second O-RAN unit that is associated with combining across symbols at an O-RAN radio unit (O-RU); and transmitting the message to the second O-RAN unit.

Clause 8. The method of clause 7, wherein the first O-RAN unit corresponds to the O-RU, and wherein the second O-RAN unit corresponds to an O-RAN distributed unit (O-DU).

Clause 9. The method of clause 8, wherein the message specifies whether the O-RU is capable of combining across symbols.

Clause 10. The method of clause 9, wherein the message specifies a maximum number of consecutive symbols that the O-RU is capable of combining.

Clause 11. The method of any of clauses 8 to 10, further comprising: receiving, from the O-DU in response to the message, a control plane (C-Plane) message from the O-DU that specifies whether the O-RU is permitted to combine consecutive symbols and/or an indication of a maximum number of consecutive symbols for which combination is permitted.

Clause 12. The method of any of clauses 7 to 11, wherein the second O-RAN unit corresponds to the O-RU, and wherein the first O-RAN unit corresponds to an O-RAN distributed unit (O-DU).

Clause 13. The method of clause 12, further comprising: receiving, from the O-RU, another message that specifies whether the O-RU is capable of combining across symbols.

Clause 14. The method of clause 13, wherein the another message specifies a maximum number of consecutive symbols that the O-RU is capable of combining.

Clause 15. The method of any of clauses 12 to 14, wherein the message specifies whether the O-RU is permitted to combine consecutive symbols and/or an indication of a maximum number of consecutive symbols for which combination is permitted.

Clause 16. The method of any of clauses 7 to 15, wherein the transmitting transmits the message via management plane (M-Plane) signaling or control plane (C-Plane) signaling.

Clause 17. A method of operating a second open radio access network (O-RAN) unit, comprising: receiving, from a first O-RAN unit, a message that is associated with combining across symbols at an O-RAN radio unit (O-RU); and performing an action in response to the message.

Clause 18. The method of clause 17, wherein the first O-RAN unit corresponds to the O-RU, and wherein the second O-RAN unit corresponds to an O-RAN distributed unit (O-DU).

Clause 19. The method of clause 18, wherein the message specifies whether the O-RU is capable of combining across symbols.

Clause 20. The method of clause 19, wherein the message specifies a maximum number of consecutive symbols that the O-RU is capable of combining.

Clause 21. The method of any of clauses 18 to 20, wherein the action comprises transmitting, to the O-RU in response to the message, a control plane (C-Plane) message that specifies whether the O-RU is permitted to combine consecutive symbols and/or an indication of a maximum number of consecutive symbols for which combination is permitted.

Clause 22. The method of any of clauses 17 to 21, wherein the second O-RAN unit corresponds to the O-RU, and wherein the first O-RAN unit corresponds to an O-RAN distributed unit (O-DU).

Clause 23. The method of clause 22, further comprising: transmitting, to the O-DU, another message that specifies whether the O-RU is capable of combining across symbols.

Clause 24. The method of clause 23, wherein the another message specifies a maximum number of consecutive symbols that the O-RU is capable of combining.

Clause 25. The method of any of clauses 22 to 24, wherein the message specifies whether the O-RU is permitted to combine consecutive symbols and/or an indication of a maximum number of consecutive symbols for which combination is permitted.

Clause 26. The method of any of clauses 17 to 25, wherein the receiving receives the message via management plane (M-Plane) signaling or control plane (C-Plane) signaling.

Clause 27. An O-RU, comprising: a memory; at least one transceiver; and at least one processor communicatively coupled to the memory and the at least one transceiver, the at least one processor configured to: receive, via the at least one transceiver, from an O-RAN distributed unit (O-DU), a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and process the C-Plane message with modulation compression in accordance with the set of RS-specific section description extensions.

Clause 28. The O-RU of clause 27, wherein at least one RS-specific section description extension of the set of RS-specific section description extensions further specifies beamforming information for the respective RS.

Clause 29. The O-RU of any of clauses 27 to 28, wherein the plurality of RSs comprises a phase tracking RS (PT-RS), a demodulation RS (DM-RS), a channel state information RS (CSI-RS), a sounding reference signal (SRS), or a combination thereof.

Clause 30. An O-DU, comprising: a memory; at least one transceiver; and at least one processor communicatively coupled to the memory and the at least one transceiver, the at least one processor configured to: configure a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and transmit, via the at least one transceiver, the C-Plane message to an O-RAN radio unit (O-RU) that supports modulation compression.

Clause 31. The O-DU of clause 30, wherein at least one RS-specific section description extension of the set of RS-specific section description extensions further specifies beamforming information for the respective RS.

Clause 32. The O-DU of any of clauses 30 to 31, wherein the plurality of RSs comprises a phase tracking RS (PT-RS), a demodulation RS (DM-RS), a channel state information RS (CSI-RS), a sounding reference signal (SRS), or a combination thereof.

Clause 33. A first O-RAN unit, comprising: a memory; at least one transceiver; and at least one processor communicatively coupled to the memory and the at least one transceiver, the at least one processor configured to: determine to transmit a message to a second O-RAN unit that is associated with combining across symbols at an O-RAN radio unit (O-RU); and transmit, via the at least one transceiver, the message to the second O-RAN unit.

Clause 34. The first O-RAN unit of clause 33, wherein the first O-RAN unit corresponds to the O-RU, and wherein the second O-RAN unit corresponds to an O-RAN distributed unit (O-DU).

Clause 35. The first O-RAN unit of clause 34, wherein the message specifies whether the O-RU is capable of combining across symbols.

Clause 36. The first O-RAN unit of clause 35, wherein the message specifies a maximum number of consecutive symbols that the O-RU is capable of combining.

Clause 37. The first O-RAN unit of any of clauses 34 to 36, wherein the at least one processor is further configured to: receive, via the at least one transceiver, from the O-DU in response to the message, a control plane (C-Plane) message from the O-DU that specifies whether the O-RU is permitted to combine consecutive symbols and/or an indication of a maximum number of consecutive symbols for which combination is permitted.

Clause 38. The first O-RAN unit of any of clauses 33 to 37, wherein the second O-RAN unit corresponds to the O-RU, and wherein the first O-RAN unit corresponds to an O-RAN distributed unit (O-DU).

Clause 39. The first O-RAN unit of clause 38, wherein the at least one processor is further configured to: receive, via the at least one transceiver, from the O-RU, another message that specifies whether the O-RU is capable of combining across symbols.

Clause 40. The first O-RAN unit of clause 39, wherein the another message specifies a maximum number of consecutive symbols that the O-RU is capable of combining.

Clause 41. The first O-RAN unit of any of clauses 38 to 40, wherein the message specifies whether the O-RU is permitted to combine consecutive symbols and/or an indication of a maximum number of consecutive symbols for which combination is permitted.

Clause 42. The first O-RAN unit of any of clauses 33 to 41, wherein the transmitting transmits the message via management plane (M-Plane) signaling or control plane (C-Plane) signaling.

Clause 43. A second O-RAN unit, comprising: a memory; at least one transceiver; and at least one processor communicatively coupled to the memory and the at least one transceiver, the at least one processor configured to: receive, via the at least one transceiver, from a first O-RAN unit, a message that is associated with combining across symbols at an O-RAN radio unit (O-RU); and perform an action in response to the message.

Clause 44. The second O-RAN unit of clause 43, wherein the first O-RAN unit corresponds to the O-RU, and wherein the second O-RAN unit corresponds to an O-RAN distributed unit (O-DU).

Clause 45. The second O-RAN unit of clause 44, wherein the message specifies whether the O-RU is capable of combining across symbols.

Clause 46. The second O-RAN unit of clause 45, wherein the message specifies a maximum number of consecutive symbols that the O-RU is capable of combining.

Clause 47. The second O-RAN unit of any of clauses 44 to 46, wherein the action comprises transmitting, to the O-RU in response to the message, a control plane (C-Plane) message that specifies whether the O-RU is permitted to combine consecutive symbols and/or an indication of a maximum number of consecutive symbols for which combination is permitted.

Clause 48. The second O-RAN unit of any of clauses 43 to 47, wherein the second O-RAN unit corresponds to the O-RU, and wherein the first O-RAN unit corresponds to an O-RAN distributed unit (O-DU).

Clause 49. The second O-RAN unit of clause 48, wherein the at least one processor is further configured to: transmit, via the at least one transceiver, to the O-DU, another message that specifies whether the O-RU is capable of combining across symbols.

Clause 50. The second O-RAN unit of clause 49, wherein the another message specifies a maximum number of consecutive symbols that the O-RU is capable of combining.

Clause 51. The second O-RAN unit of any of clauses 48 to 50, wherein the message specifies whether the O-RU is permitted to combine consecutive symbols and/or an indication of a maximum number of consecutive symbols for which combination is permitted.

Clause 52. The second O-RAN unit of any of clauses 43 to 51, wherein the receiving receives the message via management plane (M-Plane) signaling or control plane (C-Plane) signaling.

Clause 53. An O-RU, comprising: means for receiving, from an O-RAN distributed unit (O-DU), a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and means for processing the C-Plane message with modulation compression in accordance with the set of RS-specific section description extensions.

Clause 54. The O-RU of clause 53, wherein at least one RS-specific section description extension of the set of RS-specific section description extensions further specifies beamforming information for the respective RS.

Clause 55. The O-RU of any of clauses 53 to 54, wherein the plurality of RSs comprises a phase tracking RS (PT-RS), a demodulation RS (DM-RS), a channel state information RS (CSI-RS), a sounding reference signal (SRS), or a combination thereof.

Clause 56. An O-DU, comprising: means for configuring a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and means for transmitting the C-Plane message to an O-RAN radio unit (O-RU) that supports modulation compression.

Clause 57. The O-DU of clause 56, wherein at least one RS-specific section description extension of the set of RS-specific section description extensions further specifies beamforming information for the respective RS.

Clause 58. The O-DU of any of clauses 56 to 57, wherein the plurality of RSs comprises a phase tracking RS (PT-RS), a demodulation RS (DM-RS), a channel state information RS (CSI-RS), a sounding reference signal (SRS), or a combination thereof.

Clause 59. A first O-RAN unit, comprising: means for determining to transmit a message to a second O-RAN unit that is associated with combining across symbols at an O-RAN radio unit (O-RU); and means for transmitting the message to the second O-RAN unit.

Clause 60. The first O-RAN unit of clause 59, wherein the first O-RAN unit corresponds to the O-RU, and wherein the second O-RAN unit corresponds to an O-RAN distributed unit (O-DU).

Clause 61. The first O-RAN unit of clause 60, wherein the message specifies whether the O-RU is capable of combining across symbols.

Clause 62. The first O-RAN unit of clause 61, wherein the message specifies a maximum number of consecutive symbols that the O-RU is capable of combining.

Clause 63. The first O-RAN unit of any of clauses 60 to 62, further comprising: means for receiving, from the O-DU in response to the message, a control plane (C-Plane) message from the O-DU that specifies whether the O-RU is permitted to combine consecutive symbols and/or an indication of a maximum number of consecutive symbols for which combination is permitted.

Clause 64. The first O-RAN unit of any of clauses 59 to 63, wherein the second O-RAN unit corresponds to the O-RU, and wherein the first O-RAN unit corresponds to an O-RAN distributed unit (O-DU).

Clause 65. The first O-RAN unit of clause 64, further comprising: means for receiving, from the O-RU, another message that specifies whether the O-RU is capable of combining across symbols.

Clause 66. The first O-RAN unit of clause 65, wherein the another message specifies a maximum number of consecutive symbols that the O-RU is capable of combining.

Clause 67. The first O-RAN unit of clause 64, wherein the message specifies whether the O-RU is permitted to combine consecutive symbols and/or an indication of a maximum number of consecutive symbols for which combination is permitted.

Clause 68. The first O-RAN unit of any of clauses 59 to 67, wherein the transmitting transmits the message via management plane (M-Plane) signaling or control plane (C-Plane) signaling.

Clause 69. A second O-RAN unit, comprising: means for receiving, from a first O-RAN unit, a message that is associated with combining across symbols at an O-RAN radio unit (O-RU); and means for performing an action in response to the message.

Clause 70. The second O-RAN unit of clause 69, wherein the first O-RAN unit corresponds to the O-RU, and wherein the second O-RAN unit corresponds to an O-RAN distributed unit (O-DU).

Clause 71. The second O-RAN unit of clause 70, wherein the message specifies whether the O-RU is capable of combining across symbols.

Clause 72. The second O-RAN unit of clause 71, wherein the message specifies a maximum number of consecutive symbols that the O-RU is capable of combining.

Clause 73. The second O-RAN unit of any of clauses 70 to 72, wherein the action comprises transmitting, to the O-RU in response to the message, a control plane (C-Plane) message that specifies whether the O-RU is permitted to combine consecutive symbols and/or an indication of a maximum number of consecutive symbols for which combination is permitted.

Clause 74. The second O-RAN unit of clause 69, wherein the second O-RAN unit corresponds to the O-RU, and wherein the first O-RAN unit corresponds to an O-RAN distributed unit (O-DU).

Clause 75. The second O-RAN unit of clause 74, further comprising: means for transmitting, to the O-DU, another message that specifies whether the O-RU is capable of combining across symbols.

Clause 76. The second O-RAN unit of clause 75, wherein the another message specifies a maximum number of consecutive symbols that the O-RU is capable of combining.

Clause 77. The second O-RAN unit of any of clauses 74 to 76, wherein the message specifies whether the O-RU is permitted to combine consecutive symbols and/or an indication of a maximum number of consecutive symbols for which combination is permitted.

Clause 78. The second O-RAN unit of clause 69, wherein the receiving receives the message via management plane (M-Plane) signaling or control plane (C-Plane) signaling.

Clause 79. A non-transitory computer-readable medium storing computer-executable instructions that, when executed by an O-RU, cause the O-RU to: receive, from an O-RAN distributed unit (O-DU), a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and process the C-Plane message with modulation compression in accordance with the set of RS-specific section description extensions.

Clause 80. The non-transitory computer-readable medium of clause 79, wherein at least one RS-specific section description extension of the set of RS-specific section description extensions further specifies beamforming information for the respective RS.

Clause 81. The non-transitory computer-readable medium of any of clauses 79 to 80, wherein the plurality of RSs comprises a phase tracking RS (PT-RS), a demodulation RS (DM-RS), a channel state information RS (CSI-RS), a sounding reference signal (SRS), or a combination thereof.

Clause 82. A non-transitory computer-readable medium storing computer-executable instructions that, when executed by an O-DU, cause the O-DU to: configure a control plane (C-Plane) message including a section description that specifies common physical resource block (PRB) information associated with a plurality of reference signals (RSs), the section description comprising a set of RS-specific section description extensions that each specify a PRB offset and a modulation scaling factor for a respective RS among the plurality of RSs; and transmit the C-Plane message to an O-RAN radio unit (O-RU) that supports modulation compression.

Clause 83. The non-transitory computer-readable medium of clause 82, wherein at least one RS-specific section description extension of the set of RS-specific section description extensions further specifies beamforming information for the respective RS.

Clause 84. The non-transitory computer-readable medium of any of clauses 82 to 83, wherein the plurality of RSs comprises a phase tracking RS (PT-RS), a demodulation RS (DM-RS), a channel state information RS (CSI-RS), a sounding reference signal (SRS), or a combination thereof.

Clause 85. A non-transitory computer-readable medium storing computer-executable instructions that, when executed by a first O-RAN unit, cause the first O-RAN unit to: determine to transmit a message to a second O-RAN unit that is associated with combining across symbols at an O-RAN radio unit (O-RU); and transmit the message to the second O-RAN unit.

Clause 86. The non-transitory computer-readable medium of clause 85, wherein the first O-RAN unit corresponds to the O-RU, and wherein the second O-RAN unit corresponds to an O-RAN distributed unit (O-DU).

Clause 87. The non-transitory computer-readable medium of clause 86, wherein the message specifies whether the O-RU is capable of combining across symbols.

Clause 88. The non-transitory computer-readable medium of clause 87, wherein the message specifies a maximum number of consecutive symbols that the O-RU is capable of combining.

Clause 89. The non-transitory computer-readable medium of any of clauses 86 to 88, further comprising instructions that, when executed by first O-RAN unit, further cause the first O-RAN unit to: receive, from the O-DU in response to the message, a control plane (C-Plane) message from the O-DU that specifies whether the O-RU is permitted to combine consecutive symbols and/or an indication of a maximum number of consecutive symbols for which combination is permitted.

Clause 90. The non-transitory computer-readable medium of any of clauses 85 to 89, wherein the second O-RAN unit corresponds to the O-RU, and wherein the first O-RAN unit corresponds to an O-RAN distributed unit (O-DU).

Clause 91. The non-transitory computer-readable medium of clause 90, further comprising instructions that, when executed by first O-RAN unit, further cause the first O-RAN unit to: receive, from the O-RU, another message that specifies whether the O-RU is capable of combining across symbols.

Clause 92. The non-transitory computer-readable medium of clause 91, wherein the another message specifies a maximum number of consecutive symbols that the O-RU is capable of combining.

Clause 93. The non-transitory computer-readable medium of any of clauses 90 to 92, wherein the message specifies whether the O-RU is permitted to combine consecutive symbols and/or an indication of a maximum number of consecutive symbols for which combination is permitted.

Clause 94. The non-transitory computer-readable medium of any of clauses 85 to 93, wherein the transmitting transmits the message via management plane (M-Plane) signaling or control plane (C-Plane) signaling.

Clause 95. A non-transitory computer-readable medium storing computer-executable instructions that, when executed by a second O-RAN unit, cause the second O-RAN unit to: receive, from a first O-RAN unit, a message that is associated with combining across symbols at an O-RAN radio unit (O-RU); and perform an action in response to the message.

Clause 96. The non-transitory computer-readable medium of clause 95, wherein the first O-RAN unit corresponds to the O-RU, and wherein the second O-RAN unit corresponds to an O-RAN distributed unit (O-DU).

Clause 97. The non-transitory computer-readable medium of clause 96, wherein the message specifies whether the O-RU is capable of combining across symbols.

Clause 98. The non-transitory computer-readable medium of clause 97, wherein the message specifies a maximum number of consecutive symbols that the O-RU is capable of combining.

Clause 99. The non-transitory computer-readable medium of any of clauses 96 to 98, wherein the action comprises transmitting, to the O-RU in response to the message, a control plane (C-Plane) message that specifies whether the O-RU is permitted to combine consecutive symbols and/or an indication of a maximum number of consecutive symbols for which combination is permitted.

Clause 100. The non-transitory computer-readable medium of any of clauses 95 to 99, wherein the second O-RAN unit corresponds to the O-RU, and wherein the first O-RAN unit corresponds to an O-RAN distributed unit (O-DU).

Clause 101. The non-transitory computer-readable medium of clause 100, further comprising instructions that, when executed by second O-RAN unit, further cause the second O-RAN unit to: transmit, to the O-DU, another message that specifies whether the O-RU is capable of combining across symbols.

Clause 102. The non-transitory computer-readable medium of clause 101, wherein the another message specifies a maximum number of consecutive symbols that the O-RU is capable of combining.

Clause 103. The non-transitory computer-readable medium of any of clauses 100 to 102, wherein the message specifies whether the O-RU is permitted to combine consecutive symbols and/or an indication of a maximum number of consecutive symbols for which combination is permitted.

Clause 104. The non-transitory computer-readable medium of any of clauses 95 to 103, wherein the receiving receives the message via management plane (M-Plane) signaling or control plane (C-Plane) signaling.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a first open radio access network (O-RAN) unit, comprising:

determining to transmit a message to a second O-RAN unit that comprises capability information or permission information that is associated with signal combining of signal repetitions across symbols at an O-RAN radio unit (O-RU); and transmitting the message to the second O-RAN unit.

2. The method of claim 1, wherein the first O-RAN unit corresponds to the O-RU, and wherein the second O-RAN unit corresponds to an O-RAN distributed unit (O-DU).

3. The method of claim 2, wherein the message specifies whether the O-RU is capable of signal combining across symbols.

4. The method of claim 3, wherein the message specifies a maximum number of consecutive symbols that the O-RU is capable of signal combining.

5. The method of claim 2, further comprising:

receiving, from the O-DU in response to the message, a control plane (C-Plane) message from the O-DU that specifies whether the O-RU is permitted to signal combine consecutive symbols and/or an indication of a maximum number of consecutive symbols for which signal combination is permitted.

6. The method of claim 1, wherein the second O-RAN unit corresponds to the O-RU, and wherein the first O-RAN unit corresponds to an O-RAN distributed unit (O-DU).

7. The method of claim 6, further comprising:

receiving, from the O-RU, another message that specifies whether the O-RU is capable of signal combining across symbols.

8. The method of claim 7, wherein the another message specifies a maximum number of consecutive symbols that the O-RU is capable of signal combining.

9. The method of claim 6, wherein the message specifies whether the O-RU is permitted to signal combine consecutive symbols and/or an indication of a maximum number of consecutive symbols for which signal combination is permitted.

10. The method of claim 1, wherein the transmitting transmits the message via management plane (M-Plane) signaling or control plane (C-Plane) signaling.

11. A method of operating a second open radio access network (O-RAN) unit, comprising:

receiving, from a first O-RAN unit, a message that comprises capability information or permission information that is associated with signal combining of signal repetitions across symbols at an O-RAN radio unit (O-RU); and performing an action in response to the message.

12. The method of claim 11, wherein the first O-RAN unit corresponds to the O-RU, and wherein the second O-RAN unit corresponds to an O-RAN distributed unit (O-DU).

13. The method of claim 12, wherein the message specifies whether the O-RU is capable of signal combining across symbols.

14. The method of claim 13, wherein the message specifies a maximum number of consecutive symbols that the O-RU is capable of signal combining.

15. The method of claim 12, wherein the action comprises transmitting, to the O-RU in response to the message, a control plane (C-Plane) message that specifies whether the O-RU is permitted to signal combine consecutive symbols and/or an indication of a maximum number of consecutive symbols for which signal combination is permitted.

16. The method of claim 11, wherein the second O-RAN unit corresponds to the O-RU, and wherein the first O-RAN unit corresponds to an O-RAN distributed unit (O-DU).

17. The method of claim 16, further comprising:

transmitting, to the O-DU, another message that specifies whether the O-RU is capable of signal combining across symbols.

18. The method of claim 17, wherein the another message specifies a maximum number of consecutive symbols that the O-RU is capable of signal combining.

19. The method of claim 16, wherein the message specifies whether the O-RU is permitted to signal combine consecutive symbols and/or an indication of a maximum number of consecutive symbols for which signal combination is permitted.

20. The method of claim 11, wherein the receiving receives the message via management plane (M-Plane) signaling or control plane (C-Plane) signaling.

* * * * *